(12) United States Patent
Anton

(10) Patent No.: US 12,029,338 B2
(45) Date of Patent: Jul. 9, 2024

(54) DOUBLE ARTICULATED DEVICE AND SYSTEM

(71) Applicant: George-Adrian Anton, Bucharest (RO)

(72) Inventor: George-Adrian Anton, Bucharest (RO)

(73) Assignee: Folding Hangers SAL, Bucharest (RO)

( * ) Notice: Subject to any disclaimer, the term of this patent is extended or adjusted under 35 U.S.C. 154(b) by 331 days.

(21) Appl. No.: 17/443,164

(22) Filed: Jul. 21, 2021

(65) Prior Publication Data

US 2022/0000293 A1 Jan. 6, 2022

Related U.S. Application Data

(63) Continuation-in-part of application No. PCT/RO2020/050006, filed on May 15, 2020.

(30) Foreign Application Priority Data

May 15, 2019 (RO) ............................. a 2019 00289
Jul. 4, 2019 (RO) ............................. a 2019 00409

(51) Int. Cl.
*A47G 25/40* (2006.01)
*E06B 9/06* (2006.01)
(Continued)

(52) U.S. Cl.
CPC ......... *A47G 25/40* (2013.01); *A47G 25/4023* (2013.01); *E06B 9/0638* (2013.01);
(Continued)

(58) Field of Classification Search
CPC .... A47G 25/14; A47G 25/40; A47G 25/4015; A47G 25/4023; A47G 25/4038; A47G 25/50
See application file for complete search history.

(56) References Cited

U.S. PATENT DOCUMENTS 721,738 A 3/1903 Peay
1,836,935 A * 12/1931 Orkin ................. A47G 25/4038
223/89

(Continued)

FOREIGN PATENT DOCUMENTS

DE 20116172 U1 12/2001
GB 739206 A * 10/1955
JP 2018167221 A * 11/2018

OTHER PUBLICATIONS

International Search Report and Written Opinion, dated Nov. 19, 2020, 16 pages, issued in PCT Application No. PCT/RO2020/050006.

*Primary Examiner* — F Griffin Hall
(74) *Attorney, Agent, or Firm* — AVEK IP, LLC

(57) ABSTRACT

A folding hanger includes a hook extending from an upper end of a hinge pin for suspending the pin. First and second hanger arms each have proximal and distal ends and define a support surface therebetween. Each proximal end has a stop. A knuckle having a hole extends from each proximal end. The pin passes through the holes along an axis, coupling the arms and hook whereby the arms are movable between extended and folded configurations. The stops abut when the arms are extended, and are separated when folded. The hanger has a center of gravity when the arms are extended and suspended by the hook such that the axis is angled relative to vertical in a first direction and the stops bias abutting. The arms each have a center of gravity such that angular movement of the axis past an unstable equilibrium causes the arms to move toward folded.

20 Claims, 30 Drawing Sheets

(51) Int. Cl.
*E06B 9/36* (2006.01)
*F16K 1/20* (2006.01)
*F16K 47/00* (2006.01)

(52) U.S. Cl.
CPC .............. *E06B 9/0653* (2013.01); *E06B 9/36* (2013.01); *E06B 9/362* (2013.01); *F16K 1/2007* (2013.01); *F16K 1/2021* (2013.01); *F16K 47/012* (2021.08)

(56) References Cited

U.S. PATENT DOCUMENTS

| | | | | |
|---|---|---|---|---|
| 1,836,942 | A * | 12/1931 | Sumi | A47G 25/4038 |
| | | | | 15/160 |
| 5,480,076 | A * | 1/1996 | Siegel | E05F 1/1215 |
| | | | | 403/111 |
| 5,687,888 | A * | 11/1997 | Chang | A47G 25/4038 |
| | | | | 223/94 |
| 6,076,716 | A * | 6/2000 | Reyes | B60R 7/10 |
| | | | | 224/927 |
| 6,328,187 | B2 * | 12/2001 | Sugita | A47G 25/1428 |
| | | | | 223/94 |
| 6,340,104 | B1 * | 1/2002 | Saylor | A47G 25/06 |
| | | | | 223/94 |
| 7,124,920 | B2 * | 10/2006 | Gustafson | A47G 25/20 |
| | | | | 223/98 |
| 9,801,485 | B2 * | 10/2017 | Snow | A47G 25/4038 |
| 11,166,578 | B2 * | 11/2021 | Mackenzie | A47G 25/20 |
| 2016/0298284 | A1 * | 10/2016 | Rydinsky | D06F 59/02 |

* cited by examiner

FIG. 3
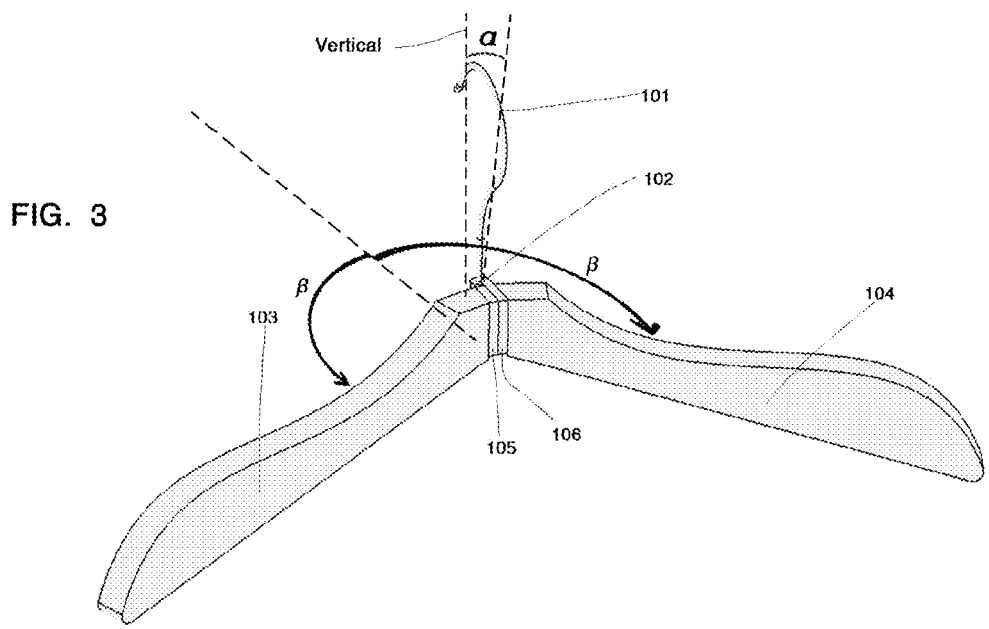
FIG. 3a
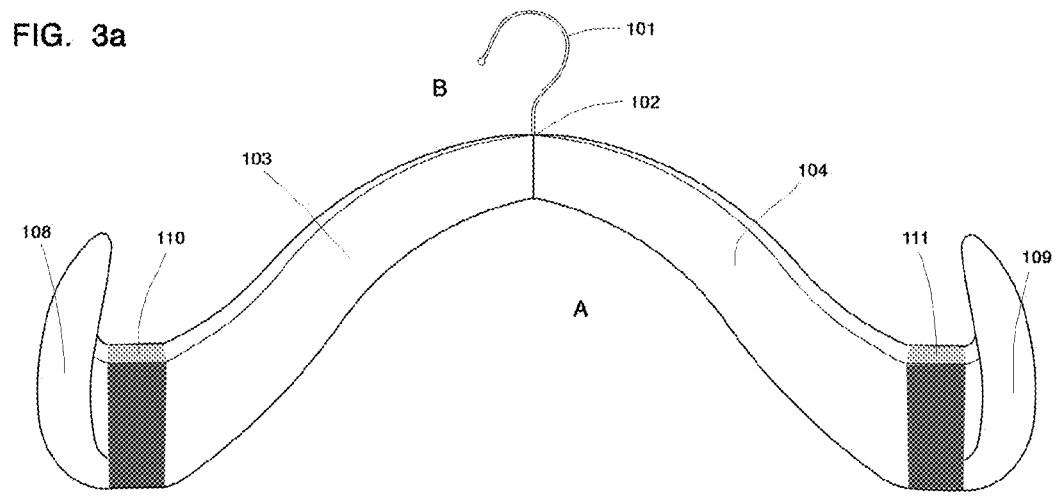
FIG. 4
FIG. 5
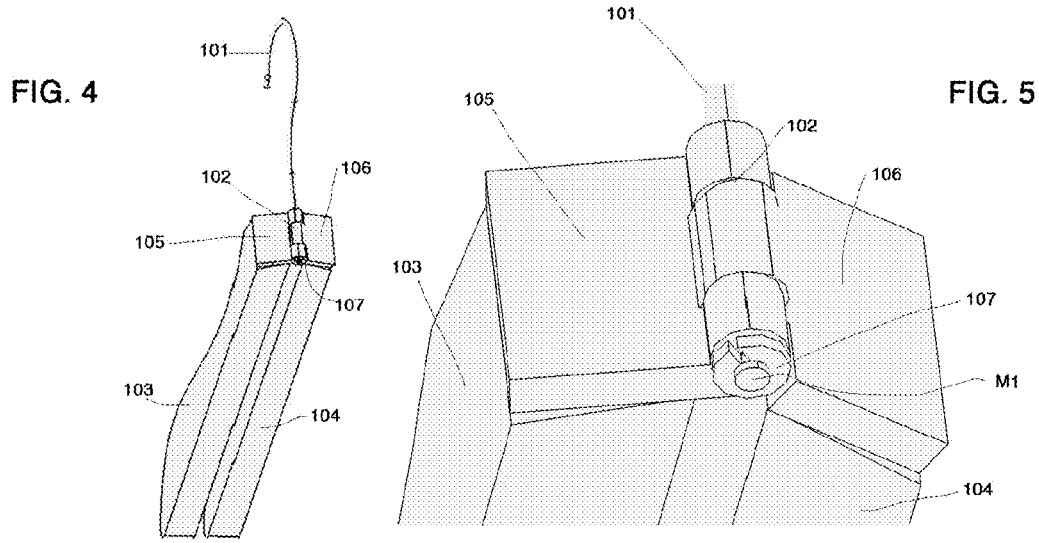

FIG. 6.a
ES 0  $a = max, \beta = max$
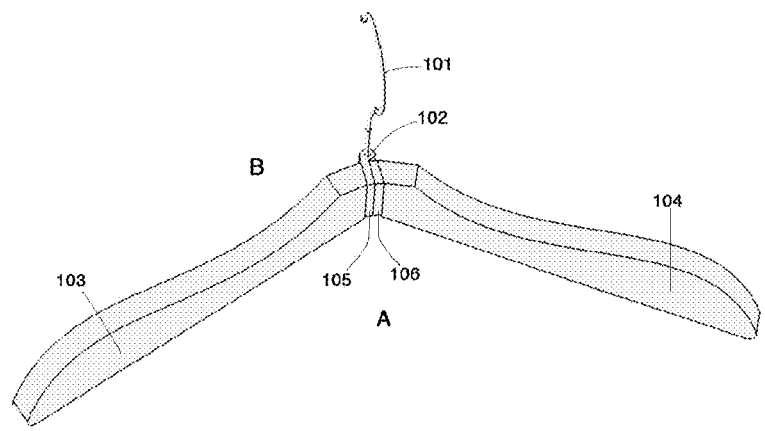
FIG. 6.b
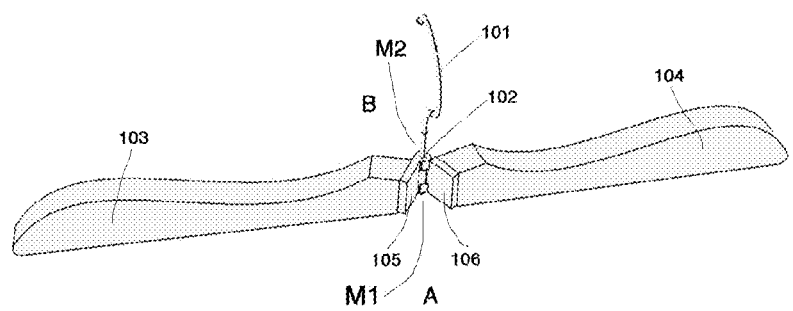
FIG. 6.c
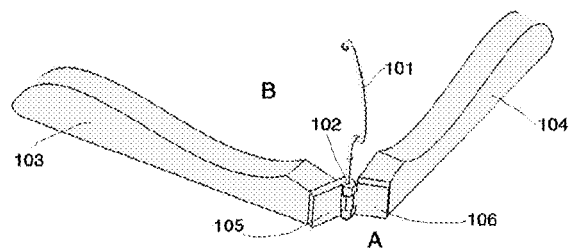
FIG. 6.d
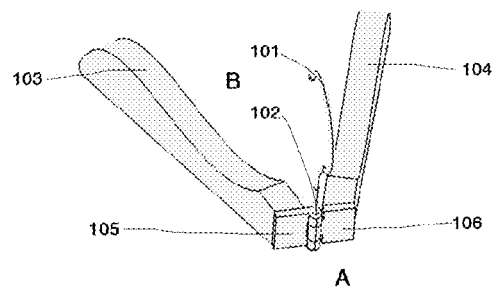
FIG. 6.e
ES 1  $a = 0, \beta = 0$
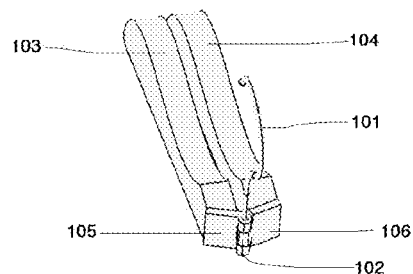

ES 0  $\alpha = max, \beta = max$

ES 1  $\alpha = 0, \beta = 0$

FIG. 12.a 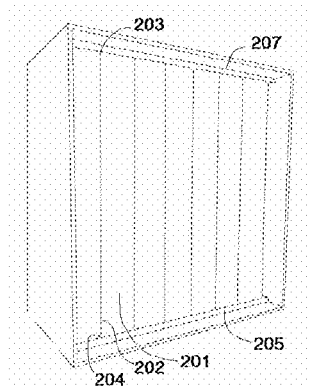 FIG. 13.a 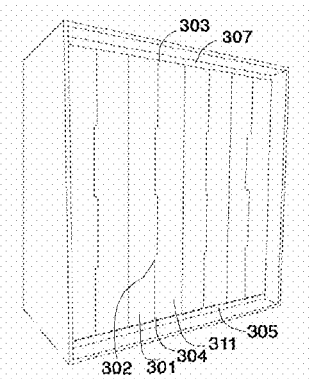
FIG. 12.b 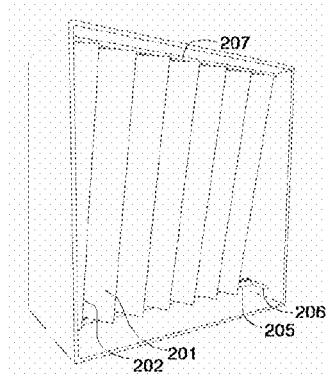 FIG. 13.b 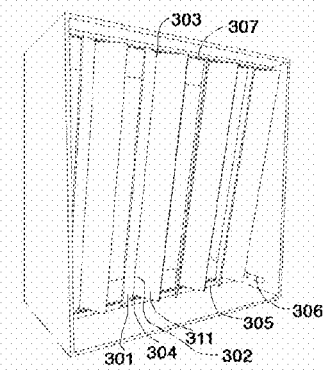
FIG. 12.c 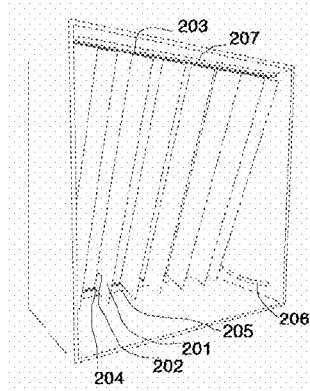 FIG. 13.c 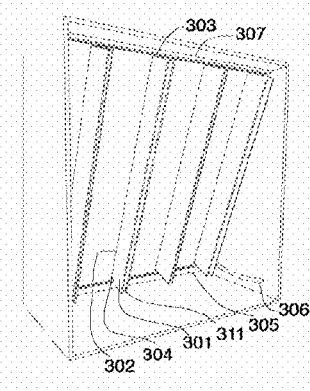
FIG. 12.d 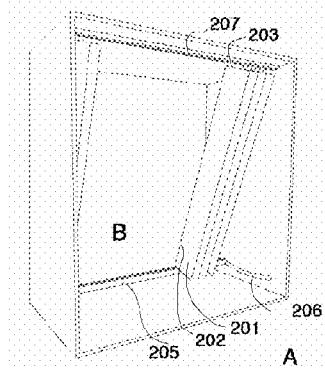 FIG. 13.d 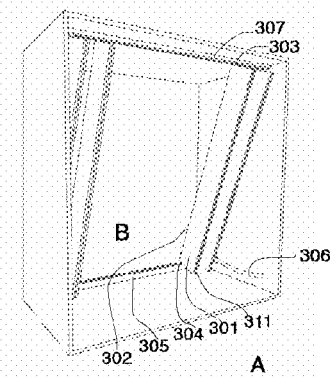

ES 1 $\alpha = 0, \beta = 0$

ES 0 $\alpha = max, \beta = max$

FIG. 16
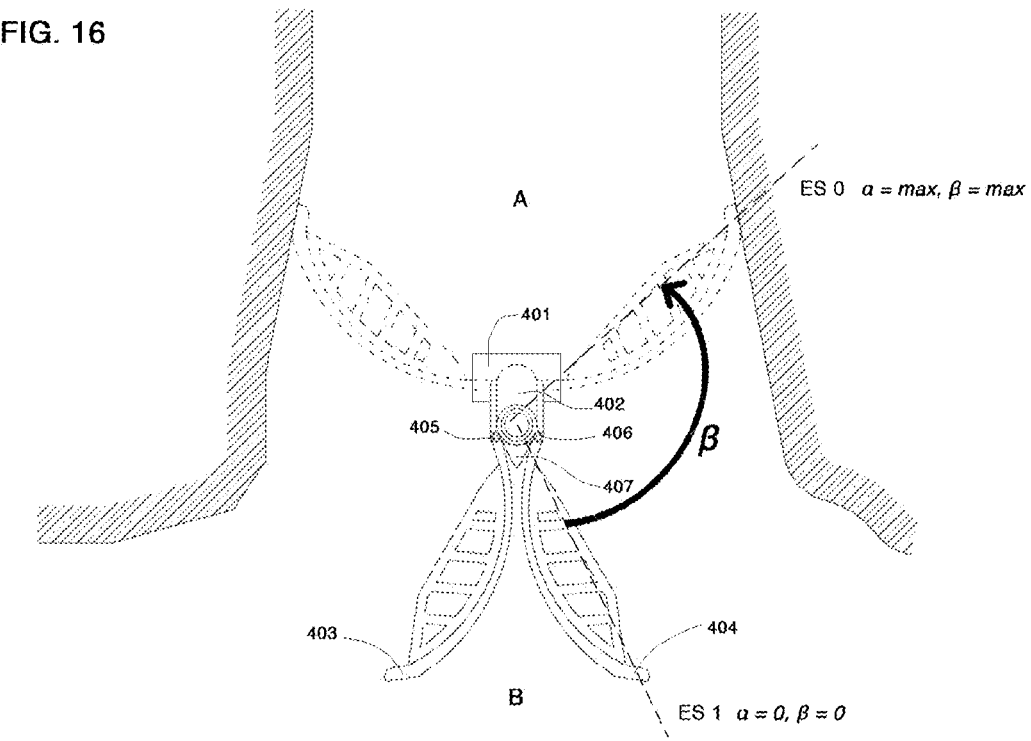
FIG. 17.a
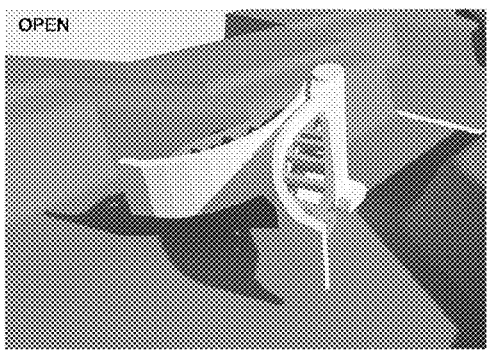
FIG. 18.a
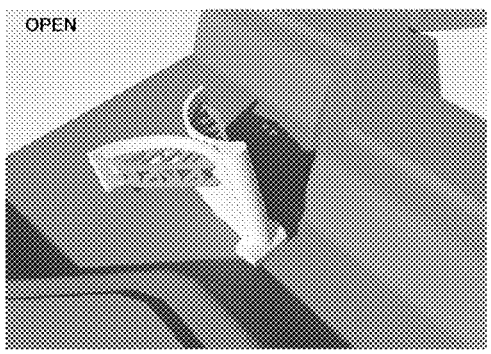
FIG. 17.b
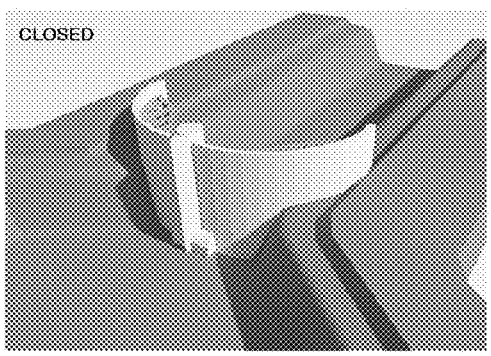
FIG. 18.b
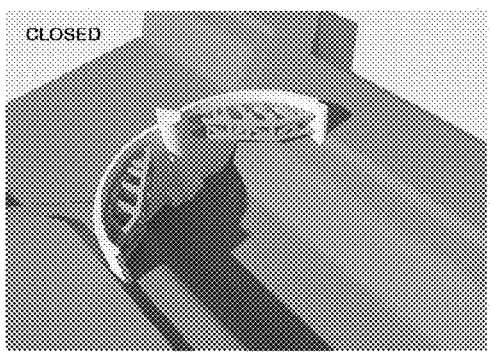

ES 0
α = max
β = max

E I
no
rotation β

ES 1
α = 0
β = 0

DOUBLE ARTICULATED DEVICE AND SYSTEM

CROSS-REFERENCE TO RELATED APPLICATIONS

This application claims priority as a continuation-in-part to PCT Application No. PCT/RO2020/050006, filed May 15, 2020 and published as WO 2020/231284, which is incorporated by reference in its entirety herein.

BACKGROUND

Several objects are known, such as a folding hanger, window shutters, vertical blinds, water dam, flood barrier, valve or other types of hydrotechnical constructions, access doors and so on, which are composed of active elements that close or fold, such as gates, lids, arms, doors, wings, slats, rods etc.

These mechanical elements are connected to the systems to which they belong using hinged joints or other types of pivoting devices which do not make use of the mass, the center of gravity or the variation of the contextual forces characterizing those mechanical elements, in order to facilitate their closing and opening.

Moreover, the non-use of these forces and variations of forces present in the system leads to the need to counteract their effects, which not only does not lower energy consumption during operation, but it also complicates the systems by introducing levers, joints, blockers, locking systems and other additional mechanisms that eventually lead to increased production costs and decreased lifespan of components and even of the system itself.

Furthermore, the need to develop products as constructively simple as possible, with a minimal number of moving components, which as much as possible use the presence of forces already existing in the system during operation, is generally known.

This continuous necessity derives from needs such as increased efficiency in the manufacturing and operation of systems, safe and predictable operability, device reliability, cost minimization in production, operation and maintenance, and the lowest possible energy consumption during production and operation.

The prior art comprises patent applications such as EP3095358A1, U.S. Pat. No. 5,687,888, WO2018/230944A1, and U.S. Pat. No. 5,690,257 in the field of folding hangers, GB792587 (U), US 2013/0022402, MX2016010362 (A), U.S. Pat. No. 2,699,652, and SG65874 (A1) in the field of hydrotechnics, and GB2509209 (A) and TWM468563 (U) in the field of vertical blinds. These documents disclose objects that contain mechanical elements that close or fold, such as gates, lids, arms, wings, doors, slats, rods etc.

In the field of folding hangers, several documents are known, such as patent applications EP3095358A1 and U.S. Pat. No. 5,687,888, which refer to clothing hangers folding around a vertical axis, provided with various locking systems to block the hanger in the "open" position, located in the vicinity of the central vertical hinge.

The disadvantage of these technical solutions is that a hanger according to any of the patents above is operable through a relatively difficult or awkward sequence of actions, some of them simultaneous, disregarding the forces in the system that, through better design, could have replaced a significant part of these actions.

Also in the field of folding hangers, patent applications such as WO2018230944A1 and U.S. Pat. No. 5,690,257 are known, which refer to folding hangers around a horizontal axis, provided with various locking systems to block the hanger in the "open" position, located in the vicinity of the central horizontal hinge.

The disadvantages of such solutions are in the sphere of manufacturing efficiency and product reliability on one hand, and on the other hand in the sphere of utility and ease of use.

The fact that, through its own form, a hanger according to U.S. Pat. No. 5,690,257A has a built-in locking device exposes the hanger to a major risk of deterioration due to the fragility of the locking device, instead of using a force present in the system, such as its own weight or the weight of the coat stored on it.

The hanger according to document WO2018230944A1 uses two springs for the relative locking in the "open" position, which in addition to the risk of accidental closure due to storing an excessively heavy garment, has the disadvantage of a very complicated construction, hence a high production cost and a short lifespan of the product, given the 15 moving components of the assembly.

In the field of hydraulic engineering, several patents are known such as GB792587 (U), US 2013,0022402), U.S. Pat. No. 2,699,652, MX2016010362 (A), and SG65874 (A1), representing dams or water flow control systems, used mainly for protection against floods. Gate systems of varying degrees of complexity, such as those in US 2013/0022402 and GB792587 (U) use complex devices such as hydraulic pumps, electric or ignition engines for activation and require human or computer control.

The disadvantage of these systems is that they cannot operate autonomously. By their design, they ignore the fact that the variation of contextually existing forces, such as the increase of the water level or flow, could deploy and implement the activation of the dam system naturally, which would make that system able to be located in areas without infrastructure and at the same time be operational in emergency conditions such as electrical surges or a faulty central control system.

Other patent applications in this field are also known, such as MX2016010362 (A), U.S. Pat. No. 2,699,652, and SG65874 (A1), representing dams or water flow control systems that are able to operate autonomously, in direct accordance with the change of the water level in a certain area.

They have the disadvantage that after their setup on a watercourse, that course is no longer navigable, so the protection of a populated area against floods by using these systems can lead to commercial or transport disadvantages.

In the field of vertical blinds, the prior art contains patent applications such as GB2509209 (A) and TWM468563 (U) representing mechanisms for folding, transporting on a rail or twisting the slats of a vertical blind. The disadvantage of these solutions is the very complicated construction, so implicitly the high manufacturing cost and the low lifespan of the components, given the degree of miniaturization, as well as the large number of moving components of the systems.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

Embodiments of the invention relate to a double articulated device and system used in objects with functionality dependent on some of their component parts coming closer to each other, moving away from each other, or pivoting between each other. Various embodiments of the invention provide a simple, reliable, and cheap double articulated device and system, which is at the same time operable with minimum energy consumption.

According to an embodiment, a folding hanger includes a hinge pin, a hook, a first hanger arm, a first knuckle, a second hanger arm, and a second knuckle. The hinge pin has upper and lower ends, and the hook is operably coupled to the hinge pin upper end for suspending the hinge pin. The first hanger arm has proximal and distal ends and defines a support surface therebetween, and the first hanger arm proximal end defines a first stop. The first knuckle extends from the first hanger arm proximal end, and the first knuckle has a first hole. The second hanger arm has proximal and distal ends and defines a support surface therebetween, and the second hanger arm proximal end defines a second stop. The second knuckle extends from the second hanger arm proximal end, and the second knuckle has a second hole. The hinge pin passes through the first hole and the second hole along a hinge axis and couples the first and second hanger arms to the hook such that the first and second hanger arms are movable relative to one another between an extended configuration and a folded configuration. The first stop abuts the second stop when the first and second hanger arms are at the extended configuration, and the first stop is separated from the second stop when the first and second hanger arms are at the folded configuration. The folding hanger has a center of gravity when the first and second hanger arms are at the extended configuration and suspended by the hook such that the hinge axis is angled relative to vertical in a first direction and the first and second stops are biased to abut one another. The folding hanger has a center of gravity when the first and second hanger arms are at the folded configuration and suspended by the hook such that the hinge axis is angled relative to vertical in a second direction and the first and second stops are biased to be separated from one another. From a stationary frame of reference, either: (a) the first direction is positive to vertical and the second direction is negative to vertical; or (b) the first direction is negative to vertical and the second direction is positive to vertical.

According to another embodiment, a folding hanger includes a hinge pin, a hook, a first hanger arm, a first knuckle, a second hanger arm, and a second knuckle. The hinge pin has upper and lower ends, and the hook is operably coupled to the hinge pin upper end for suspending the hinge pin. The first hanger arm has proximal and distal ends and defines a support surface therebetween, and the first hanger arm proximal end has a first stop. The first knuckle extends from the first hanger arm proximal end, and the first knuckle has a first hole. The second hanger arm has proximal and distal ends and defines a support surface therebetween, and the second hanger arm proximal end has a second stop. The second knuckle extends from the second hanger arm proximal end, and the second knuckle has a second hole. The hinge pin passes through the first hole and the second hole along a hinge axis and couples the first and second hanger arms to the hook such that the first and second hanger arms are movable relative to one another between an extended configuration and a folded configuration. The first stop abuts the second stop when the first and second hanger arms are at the extended configuration, and the first stop is separated from the second stop when the first and second hanger arms are at the folded configuration. The folding hanger has a center of gravity when the first and second hanger arms are at the extended configuration and suspended by the hook such that the hinge axis is angled relative to vertical in a first direction and the first and second stops are biased to abut one another. The first hanger arm and the second hanger arm each have a respective center of gravity such that angular movement of the hinge axis past an unstable equilibrium causes the first and second hanger arms to move toward the folded configuration.

According to still another embodiment, a folding hanger includes a hinge pin, a hook, a first hanger arm, a first knuckle, a second hanger arm, and a second knuckle. The hinge pin has upper and lower ends, and the hook is operably coupled to the hinge pin upper end for suspending the hinge pin. The first hanger arm has proximal and distal ends and defines a support surface therebetween, and the first hanger arm proximal end has a first stop. The first knuckle extends from the first hanger arm proximal end, and the first knuckle has a first hole. The second hanger arm has proximal and distal ends and defines a support surface therebetween, and the second hanger arm proximal end has a second stop. The second knuckle extends from the second hanger arm proximal end, and the second knuckle has a second hole. The hinge pin passes through the first hole and the second hole along a hinge axis and couples the first and second hanger arms to the hook such that the first and second hanger arms are movable relative to one another between an extended configuration and a folded configuration. The first stop abuts the second stop when the first and second hanger arms are at the extended configuration, and the first stop is separated from the second stop when the first and second hanger arms are at the folded configuration. The folding hanger has a center of gravity when the first and second hanger arms are at the extended configuration and suspended by the hook such that: the hinge axis is angled relative to vertical in a first direction and the first and second stops are biased to abut one another. The first hanger arm and the second hanger arm each have a respective center of gravity such that angular movement of the hinge pin away from the first direction past vertical causes the first and second hanger arms to automatically move toward the folded configuration.

BRIEF DESCRIPTION OF THE DRAWINGS

FIG. 3 is a front view of the hanger of FIG. 2, in the "open" position.

FIG. 3a is a front view of the foldable of FIG. 2, configured for holding skirts and trousers.

FIG. 4 is a view of the hanger of FIG. 2, in a "folded" position.

FIG. 5 is a detailed view taken from FIG. 4 from the area of the axis of rotation.

FIGS. 6a, 6b, 6c, 6d, and 6e represent successive transitory stages on the trajectory of movement that the hanger of FIG. 2 traverses between the "open" position (FIG. 6a) and the "folded" position (FIG. 6e).

FIGS. 12*a*, 12*b*, and 12*c* represent successive transient stages on the trajectory of movement that the shutter system of FIG. 10 traverses between the positions "closed" (FIG. 12*a*) and "open" (FIG. 12*c*).

FIG. 12*d* is a perspective view of the shutter system of FIG. 10, with slats brought close together and slid to the sides.

FIGS. 13*a*, 13*b*, and 13*c* represent successive transient stages on the trajectory of movement that the shutter system of FIG. 10 traverses between the "closed" position (FIG. 13*a*) and another "open" position (FIG. 13*c*).

FIG. 13*d* is a perspective view of the shutter system of FIG. 10, with slats slid differently than in FIG. 12*d*.

FIG. 16 is a top view of the flood barrier gate of FIG. 14, in the "open" position and with the "closed" position shown in dotted lines.

FIG. 17*a* is a perspective view from zone B of the flood barrier gate of FIG. 14, in the "open" position.

FIG. 17*b* is a perspective view from zone B of the flood barrier gate of FIG. 14, in the "closed" position.

FIG. 18*a* is a perspective view of zone A of the flood barrier gate of FIG. 14, in the "open" position.

FIG. 18*b* is a perspective view from zone A of the flood barrier gate of FIG. 14, in the "closed" position.

DETAILED DESCRIPTION

Figure 1:
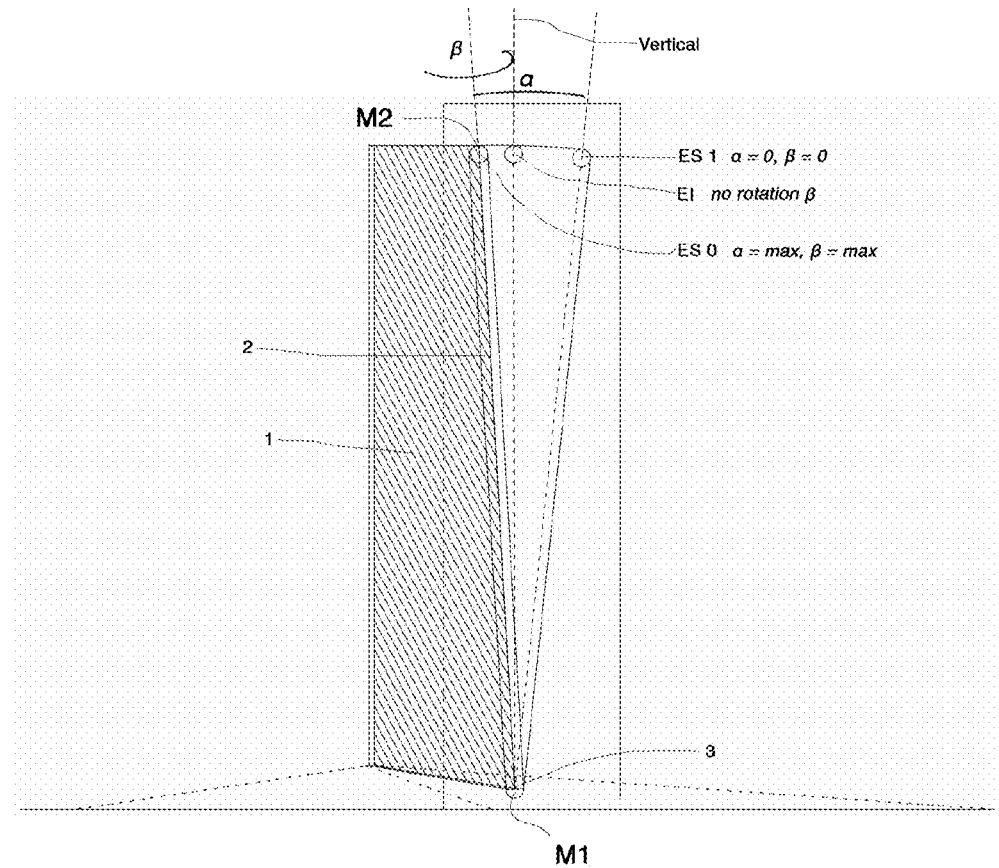
FIG. 1 is a schematic view of a double articulated device and system according to an embodiment of the invention.

Throughout this document, terms such as "comprises" or variations thereof, such as "includes," "contains," and so on, will be interpreted as the nonexclusive inclusion of the elements, steps, procedures, groups of elements, steps or procedures disclosed. And while the word "invention" is often used, the scope of protection is to be judged by the claims.

In various embodiments, the invention relates to a double articulated device and system comprising at least one active element provided with an edge (M), having two points (M1) and (M2), where (M1) is different from (M2), a rotating element connected to the edge (M), and a rotating fixture positioned at the point (M1) of the edge (M) and connected to the rotating element, in which, during actuation, the active element has simultaneously a rotational movement with an angle b around the rotating element and a partial pivoting movement in the vertical plane around a rotating fixture, so that the point (M2) of the edge (M) describes an angle a between a value $a_{max}$ corresponding to the "open" position ES0 and a value $a_{min}$ corresponding to an ES1 "closed" position of the device.

In the context of the invention, the double articulated device can have the active element of a substantially flat, trapezoidal shape.

At the same time, in the preferred embodiments, the pivoting angle a has values between 5° and 20°, and the rotation angle b can have values between 90° and 110° in the case of the embodiment of an access door or gate, values between 100° and 120° in the embodiment of a foldable hanger, or values between 90° and 135° in the case of a flood barrier gates.

In the double articulated device according to the invention, the pivoting movement of the point (M2) of the edge (M) can be performed by external means such as lever systems, with counterweights or motorized systems.

In the case of the hanger and the flood barrier, the embodiments comprise two active elements, each of these elements having the edge (M) connected to the rotating element, and the two "mirrored" active elements are mounted symmetrically to the rotating element so that the points (M1) and (M2) of the edge M are collinear. At the same time, the double-articulated devices of these embodiments are provided with means that ensure the limitation of the range of motion described by the two active elements at a predefined angle $B_{max}$.

In another embodiment of the hanger type device, the two hanger arms are provided at the outer extremities with two endings having shapes similar to the section of human hips, and the two hanger arms can be provided with mechanisms that ensure the adjustment of the length of the arms, such as spacers, telescopes, springs, sliding rails etc. in order to adjust the total width of the hanger in the "open" position.

The double articulated access gate type device may further comprise shock absorbers at the ends of the range of motion a of the active element.

Also, the double articulated device according to the invention can be used in the manufacture of folding hangers, vertical blinds or shutters, in hydro-technical constructions such as flood gates, wings, valves or for liquid flow regulation, or in access doors or gates.

FIG. 1 represents a schematic view of a device and system according to the invention, with the active element in the form of a trapezoidal wing, the rotating fixture to the reference system being by example arranged in the lower end of the axis of rotation supporting the active element.

The elements of FIG. 1 are:
1: active element
2: relatively vertical axis of rotation around which the active element 1 is mobile
3: rotating fixture to the reference system of the axis of rotation 2, around which the axis of rotation 2 is mobile
M: edge with points M1 and M2
a: pivoting angle described by the edge M around the rotating fixture 3, with the values $a_{min}$ and $a_{max}$
b: rotation angle described by the edge M around the axis of rotation 2, with the values $b_{min}$ and $b_{max}$
ES 0: initial stable equilibrium point, in which the double articulated system is in a certain operating stage, such as "open"
E1: unstable equilibrium point on the trajectory between any two stable equilibrium points representing different stages of operation of the system
ES1: stable equilibrium point, representing another stage of operation of the system such as "closed," toward which the system will move alone, without energy consumption, after being pushed on the path ES 0-ES 1, only until the E1 point is exceeded Embodiments of the invention consist of a double articulated device and system comprising one or more active elements 1 such as gates, covers, arms, doors, wings, slats, rods, provided with an edge (M) having two points (M1, M2), connected to a rotating element 2, which open or close by partial rotation about the rotating element 2, the axis of rotation being pivotally mobile around a rotating fixture 3. The double articulated device according to the invention is able to move from one operating stage to another, such as from "closed" ES 0 to "open" ES1, by applying a minimal force to move the center of gravity of the device from one side of the rotating fixture 3 to another, by pivoting the point (M2) of the edge (M) achieving a movement at an angle a between a value $a_{max}$ corresponding to the "open" position ES0 and an $a_{min}$ corresponding to a "closed" position ES1 of the device.

The particular feature of the device of being in unstable equilibrium E1 when its center of gravity and the rotating fixture 3 are the closest possible, means that when a minimum force is applied to the device which immediately after passing the unstable equilibrium E1 will horizontally move the center of gravity of the device away from its rotating fixture 3 in a certain direction, the double articulated device will have the tendency to fall naturally and without energy consumption into other points of stable equilibrium, like "device fully closed" ES 0, "device fully open" ES 1, or stable or indifferent equilibrium like "device partially open," equilibrium points that are located close to the direction of gravity relative to the rotating fixture 3.

The present invention may have the advantage of moving a double articulated device between the "closed" ES 0 and "open" ES 1 positions with a minimum energy consumption, depending on how short the distance is between the initial stable equilibrium point ES 0 of the device and the unique point of unstable equilibrium E1, so that after exceeding the unstable equilibrium E1, the device falls by itself into the desired stable equilibrium point ES 1.

A foldable hanger (FIGS. 2-9), a vertical shutter or window blind (FIGS. 10-13), a flood barrier gate (FIGS. 14-18), an access gate (FIGS. 19-26), and another foldable hanger (FIGS. 27-36D) are presented as examples.

The materials and shapes used in the embodiments of this invention are given as examples and have been preferred for reasons such as reliability, and efficiency in production and operation; the inventive concept for which protection is claimed in this document refers to the principle of functioning and not to the shapes or materials used in the embodiments except as set forth in the claims.

The embodiments disclosed in this document can be manufactured using existing or future production technologies such as but not limited to thermoforming, cutting, welding, grinding, and milling using specific machines and tools with manual or computer control. The invention covers any other system that could use the concept disclosed in this document in order to take advantage of the variation of the resultant forces related to the elements in a mobile system, in order to change their position in the system to which they belong.

The present invention discloses a double articulated device and system which, both by the multitude and diversity of embodiments and by the high degree of added value brought in each area given as an example, in the form of energy saved, increased efficiency in manufacture and operation and so on, proves industrial applicability.

Foldable Hanger

Some embodiments relate to a foldable hanger comprising a rotating fixture 101 connected to two active elements in the form of hanger arms 103 and 104 by a rotating joint type element with an axis of rotation 102 that is vertical in relation to the hanger, joint that is disposed in the central area of the hanger, characterized in that the change of the center of gravity of the hanger towards the front A or towards the rear B determines the tendency of the hanger to fall into one of the "open" or "folded" positions, positions which approximately coincide with the ends of the range of motion b of the central joint with the relatively vertical axis 102 of the hanger. The active elements in the form of hanger arms 103 and 104 are provided with an edge M, with two points M1 and M2, and have a rotational movement with an angle b around the axis 102 and a partial pivoting movement in vertical plane, with an angle a between a maximum value $a_{max}$ and a minimum value $a_{min}$. The folding hanger is an embodiment of the invention, in the sense that the two arms of the hanger 103 and 104 represent the active elements of the system, which open or close by partially rotating around the axis of rotation 102 of the joint present in the central area of the hanger, axis of rotation which in turn, by means of the hanger hook 101, is pivotable around a rotating fixture to the reference system, that is the point of contact between the inside of the hanger hook and a horizontal hanger rod inside a closet.

The hanger is described referring to FIGS. 2, 3, 3a, 4, 5, 6a, 6b, 6c, 6d, 6e, 7, 8, and 9.

Figure 2:
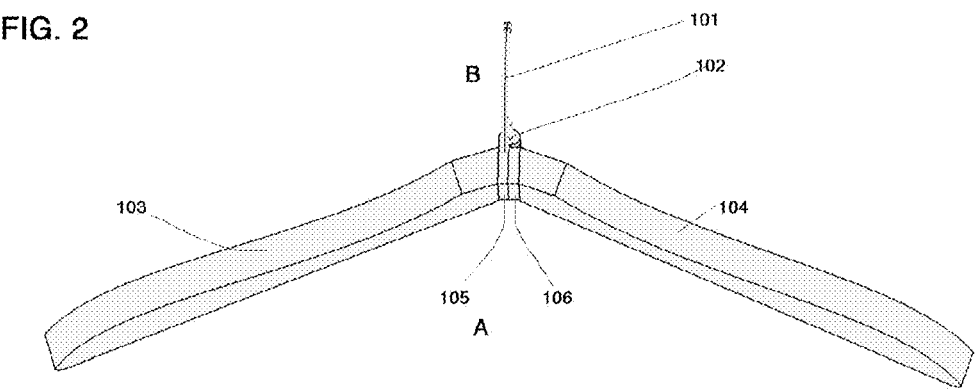
FIG. 2 is a top view of a hanger according to an embodiment of the invention in an "open" position, corresponding to a rotation angle $B_{max}$ and a pivoting angle $a_{max}$.

FIG. 2 is a top view of the hanger according to the invention in the "open" position, corresponding to a rotation angle $B_{max}$ and a pivoting angle $a_{max}$.

FIG. 3 is a front view of the hanger according to the invention, in the "open" position.

FIG. 3a is a front view of the foldable hanger for skirts and trousers according to the invention, provided at the outer extremities with mechanisms such as terminations 108 and 109, shaped similar to the section of a human hip, to fix a garment like skirt or trousers, and with spacers 110 and 111, mounted in the body of the arms 103 and 104, which ensure the adjustment of the length of the arms 103 and 104 and meant to adapt the width of the hanger to the size of the waist of the clothing items.

FIG. 4 is a view of the hanger according to the invention, in the "folded" position.

FIG. 5 represents a detailed view from the area of the axis of rotation of the hanger.

FIGS. 6a, 6b, 6c, 6d, and 6e represent successive transitory stages on the trajectory of movement that the folding hanger according to the invention traverses between the "open" position (FIG. 6a) and the "folded" position (FIG. 6e).

Figure 7:
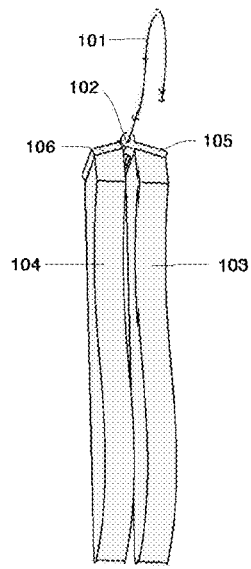
FIG. 7 shows the hanger of FIG. 2 in the "folded" position.

FIG. 7 is a view of the hanger according to the invention, in the "folded" position.

Figure 8:
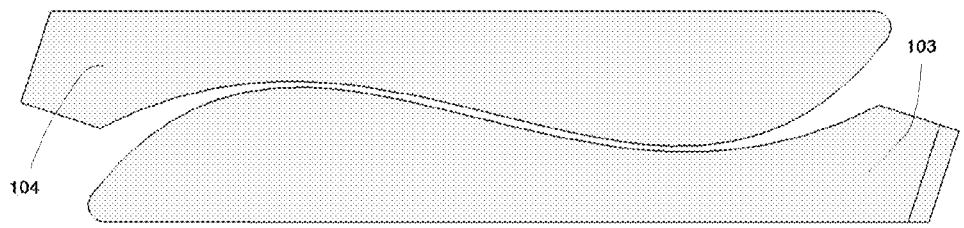
FIG. 8 is a side view of a pair of arms of the hanger of FIG. 2, placed superimposed, in the way in which they occupy together the smallest volume.

FIG. 8 represents a side view of a pair of arms of the hanger according to the invention, placed superimposed, in the way in which they occupy together the smallest volume.

Figure 9:
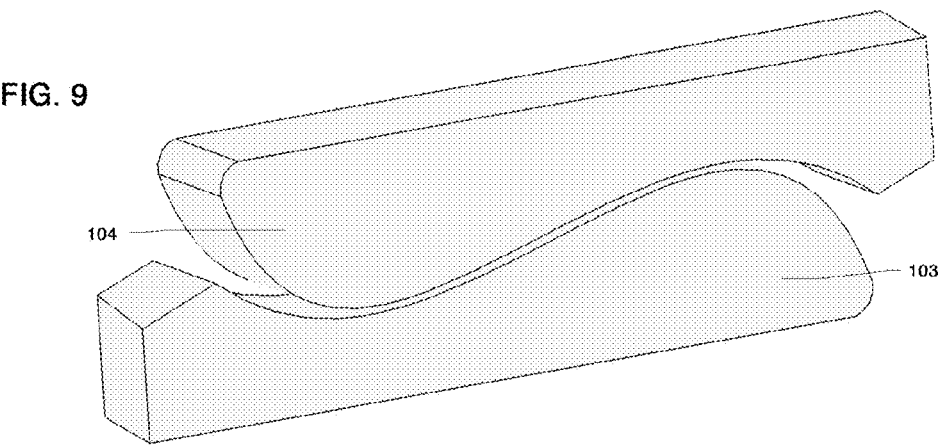
FIG. 9 is a perspective view of the pair of hanger arms arranged as in FIG. 8.

FIG. 9 represents a perspective view of a pair of hanger arms according to the invention, placed superimposed, in the variant in which they occupy together the smallest volume.

The notation of the elements in the drawings represents:
- A: the area considered to be in front of the hanger, where in the "open" position the angle formed by arms 103 and 104 is less than 180 degrees
- B: the area considered to be behind the hanger, where in the "folded" position the angle formed by the arms 103 and 104 is greater than 180 degrees
- 101: rotating fixture for holding the hanger connected to the reference system
- 102: prolongation of the support 101 which forms the axis of rotation of the central articulation of the hanger
- 103: right arm of the hanger
- 104: the left arm of the hanger
- 105: the right element of the central joint of the hanger
- 106: the left element of the central joint of the hanger
- 107: the blocker at the end of the axis of rotation 102, holding together the elements 105 and 106
- M: the edge with the two points M1 and M2, the angles a and b of pivoting and rotation respectively, of the arms 103 and 104

The hanger is in unstable equilibrium when its center of gravity and the point of connection to the reference system are superimposed, as illustrated in FIG. 6b.

Pushing or twisting the hanger vertically forward A moves away the center of gravity of the device horizontally from its rotating fixture to the reference system forward A, so that the hanger according to the invention tends to fall into the "open" position shown in FIG. 6a, as this represents the stable equilibrium point close to the direction in which the center of gravity is directed in relation to the rotating fixture to the reference system.

Pushing or twisting the hanger vertically backwards B moves away the center of gravity of the device horizontally from its rotating fixture to the reference system backwards B, so that the hanger according to the invention tends to fall into the "folded" position shown in FIG. 6e, rapidly passing through intermediate instantaneous positions illustrated in FIG. 6c and FIG. 6d, as this represents the stable equilibrium point close to the direction in which the center of gravity is directed in relation to the rotating fixture to the reference system.

The arms 103 and 104 of the hanger incorporate the elements 105 and 106, respectively, of a rotating joint such as a hinge, whereby the rotating fixture, in this case the hook 101, is continued with the portion 102 which acts as a central rotating axis, which after it passes through the hinge barrels, is being fixed below with a blocker 107 which may be for example in the form of a rivet, a graver washer around a groove dug around the shaft, or a nut around a threaded end of the shaft.

The inner faces of the arms 103 and 104, which come into contact when the hanger is in the "open" position, form with the front and rear faces of the arms of which they are part, respectively, an angle which allows them when the hanger is in the "open" position, to rest against each other, so that both the weight of the hanger and the weight of the garment placed on the hanger prevent the hanger from accidentally falling into the "folded" position which would facilitate the unwanted fall of the coat from the hanger.

When the hanger, in the "open" position as shown in FIG. 6a, is storing a garment in anatomical position, for example while attached to a horizontal rod inside a wardrobe, it is enough for the user to grip the garment from its more accessible shoulder and to make a twisting movement towards the back of the hanger B, so that the hanger falls into its "folded" position illustrated in FIG. 6e, in order to instantly release the coat in the user's hand and remain hooked on the horizontal rod of the closet, in "folded" position.

The hanger may be simple and inexpensive in terms of production costs, and may make putting and removing clothes in and out of the anatomical position of storage with one hand possible, with significantly less effort and significantly greater speed than any solution found in prior art, without the need to remove the hanger from the closet in order to remove the stored garment off the hanger.

The foldability of the hanger according to the invention also brings the advantage of a much smaller volume occupied when it does not perform the function of holding a garment.

Thus, in the embodiment of the present document, locking the central rotary shaft 102 of the hanger with a grover washer, nut, or other removable device 107 has been preferred, so that the hanger is easy to disassemble and reassemble.

For storing several hangers according to the invention so that they occupy the least volume possible, especially when they have the hooks removed, it was preferred that the upper face of the arms 103 and 104 be complementary to itself. Thus, two hanger arms according to the invention can be stored superimposed, as illustrated in FIG. 8 and FIG. 9.

Window Shutters or Blinds

Some embodiments relate to a gravitationally adjustable window shutter system comprising one or more active elements in the form of rotary closure blades or slats 201 provided with the edge M represented by the rotating elements 202 and 302, respectively, connected in two points to the edge M. 203 represents the point M1, and 204 represents the point M2, with one of the points 203 being on a common fixed rail 207 and operating as the rotating fixture to the reference system and the other 204 being on a common rod 205, to which some auxiliary rotating sliders 204, 304 are collinearly attached. Common rod 205 is attached to a guiding system 206, so that changing the position of the rod 205, to which all the slats 201 are attached, on the guides 206, determines the change of the side or modifies the horizontal distance between the rotating fixture 203 of each slat 201 and the center of gravity of each slat 201.

The gravitationally adjustable shutter system is an embodiment of a system according to the invention, in the sense that each slat 201, together with its own rotating fixture 203 and its own auxiliary rotating slider 204 connected to a rod 205 common to all slats, constitutes a double articulated system according to the invention. Thus, any slat 201 can rotate both horizontally around the rotating element such as its own vertical edge 202 with an angle b, and in the vertical plane containing the rotating fixture 203 with an angle a.

The shutter is described referring to the drawings FIGS. 10, 11, 12a, 12b, 12c, 12d, 13a, 13b, 13c, and 13d.

Figure 10:
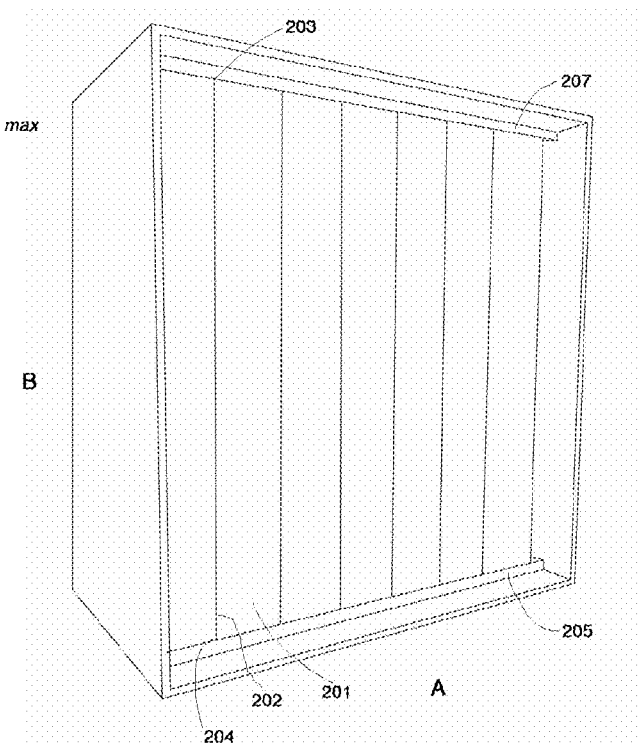
FIG. 10 is a perspective view of a shutter system according to an embodiment of the invention, in a "closed" position, taking the form of an opaque surface that completely covers the surface of a window.

FIG. 10 is an overview of the shutter system according to the invention, in the "closed" position, taking the form of an opaque surface that completely covers the surface of a window.

Figure 11:
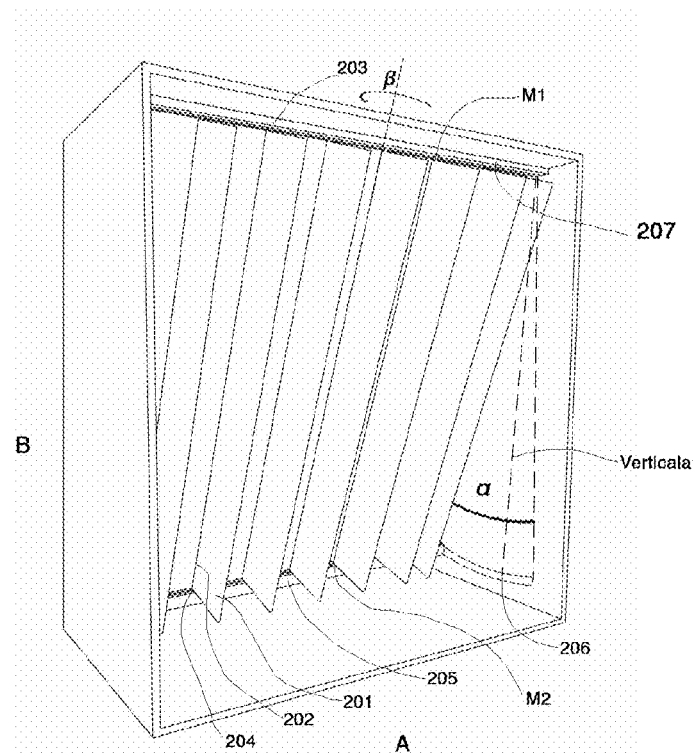
FIG. 11 is a perspective view of the shutter system of FIG. 10, in an "open" position, in which each slat is positioned perpendicular to the window, so as not to obscure the surface of a window.

FIG. 11 is an overview of the shutter system according to the invention, in the "open" position, in which each slat is positioned perpendicular to the window, so as not to obscure the surface of a window at all.

FIGS. 12a, 12b, and 12c represent successive transient stages on the trajectory of movement that the system of folding shutters according to the invention traverses between the positions "closed" (FIG. 12a) and "open" (FIG. 12c).

FIG. 12d is an overview of the shutter system according to the invention, when the slats 201 have been brought close together and slid to the sides, on the rail 207 containing the upper rotating fixtures 203 of each slat 201 and also on the common rod 205 to which all the slats 201 are attached at their lower extremities.

FIGS. 13a, 13b, and 13c represent successive transient stages on the trajectory of movement that the system of folding shutters according to the invention with blades 301, 311 coupled two at each rotating vertical axis 302, traverses it between the "closed" position (FIG. 13a) and "open" (FIG. 13c).

FIG. 13d is an overview of the system of folding shutters according to the invention with slats 301, 311 coupled two at each rotating vertical axis 302, when the slats 301 and 311 were close to each other and sliding sideways, on the rail 307 containing the upper rotating fixtures 303 of each pair of slats and at the same time on the common rod 305 to which all the pairs of slats are fastened at their lower extremities.

The notation of the elements in the drawings represents:
A: the area considered to be in front of the shutter
B: the area considered to be behind the shutter
201: rotating slat
202: longitudinal axis of rotation of the rotating slat 201
203: rotating fixture of the axis of rotation 202 in the upper rail for sliding the slats aside 207
204: auxiliary rotating slider connecting the axis of rotation 202 to the lower common rod 205 for orienting the slats
205: lower common rod for the orientation of the slats
206: guide for the rod 205
207: upper rail for sliding the slats aside
301 and 311: pair of rotating slats
302: common central longitudinal axis of rotation for the pair of rotary slats 301 and 311
303: rotating fixture of the axis of rotation 302 in the upper rail for sliding the slats aside 307

304: auxiliary rotating slider connecting the axis of rotation 302 to the lower common rod for orienting the pairs of slats 305
305: lower common rod for orienting the pairs of slats
306: guide for the rod 305
307: upper rail for sliding the pairs of slats aside
M: edge represented by the rotating elements 202, 302 respectively, the rotation angle b and the pivoting angle a The gravitationally adjustable shutter system is an embodiment of the invention, in the sense that the slats represent the active elements of the system, which open or close by a rotation with an angle b around each one's own longitudinal axis of rotation 202, 302, axis which in turn, with the help of the auxiliary rotating slider 204, the common rod 205, is movable, describes a partial pivoting movement with an angle a around a rotating fixture to the reference system 203, 303 so that the operating stages "closed," "open," or various degrees of intermediate opening of the shutter are obtained by orienting the slats in various directions under their own weight, varying the side or horizontal distance between the two points of attachment of each slat to the system which they are part of.

The shutter is in unstable equilibrium when the center of gravity of the blades 201 and their points of attachment to the reference system 203 are superimposed, as illustrated in FIG. 12b.

Pushing the lower common rod 205 towards the rear B of the shutter horizontally moves away the center of gravity of each slat 201 from its rotating fixture to the reference system 203 towards the back B, so that the shutter according to the invention tends to fall without energy consumption in the "open" position illustrated in FIG. 11 and FIG. 12c, as this represents the stable equilibrium point close to the direction of the center of gravity of each slat 201 relative to the rotating fixture to the reference system 203. Pulling the lower common rod 205 towards the front A of the shutter moves away horizontally the center of gravity of each slat 201 from its rotating fixture to the reference system 203 towards the front A, so that the shutter according to the invention tends to fall into the "closed" position illustrated in FIG. 10 and FIG. 12a, as this is the stable equilibrium point close to the direction in which the center of gravity of each slat 201 is directed in relation to the rotating fixture to the reference system 203.

FIGS. 13a, 13b, 13c, and 13d illustrate another version of the shutter according to the invention, in which instead of a rotating slat, a pair of rotating slats was chosen, the operating principle remaining identical.

The pairs of blades 301 and 311 are constructively symmetrical, incorporating on their common vertical edge 302 the elements of a rotating joint such as a hinge, through which the rotating fixture 303 in the upper rail 307 continues with a rotating shaft, which after passing through the hinge barrels, is connected below to the lower common rod 305 with the auxiliary rotating slider 304.

Following the implementation of the disclosed inventive concept, each pair of blades 301 and 311 can be rotated horizontally around their own common vertical axis 302 so as to stick to each other in a plane perpendicular to the window, or to open in a plane approximately parallel to the window, depending on the change in position of their center of gravity.

The change of the center of gravity is achieved by vertically rotating the common axis of rotation 302 around the rotating fixture 303 to the reference system.

For the operation of the shutter, it would be sufficient for the upper rotating fixtures 203, 303 of the slats 201 or the pairs of slats 301, 311 to be disposed at equal distances, directly in the upper windowsill or in the ceiling of the room where the shutter is installed.

However, for functional reasons, so that the area of the window or opening covered by the shutter according to the invention can be completely cleared as illustrated in FIG. 12d and FIG. 13d, respectively, it's been opted for the upper rails for sliding the slats aside 207 and 307, provided with semi-locking steps predefined at distances equal to the widths of the slats 201 or the pairs of slats 301, 311.

The disclosure provides a constructively simple window shutter, which implies a low manufacturing cost and a high degree of system reliability, as well as an easy troubleshooting in case of damage to the components.

The shutter according to the invention also makes it possible to close and open almost instantly, regardless of the area of the window or opening it covers, using the weight of the slats themselves.

Depending on the materials which the slats and all other components are made of on the one hand and its location relative to the window or the opening it covers on the other hand, the shutter according to the invention can function both inside as vertical blind to control the quantity of light, as well as outdoors as a blind or curtain-type façade installation, for protection against various meteorological phenomena such as storms, rain, blizzards, as well as "antitheft" security systems.

If the slats are made of relatively light materials and the forces that may occur in the environment, such as strong winds, could cause uncontrolled movement of the shutter, additional mechanical elements can be placed in the vicinity of the slats for guiding or locking them in the desired position, such as stops, guide spurs, latches, etc.

The window shutter according to the invention is also functional in the absence of motorized control systems, since the force required to actuate it is minimal, the movement of the components being made mostly under the action of the weight of its own active elements.

Flood Barrier or Liquid Flow Control Gate

Some embodiments relate to a flood or liquid flow control gate, comprising a rotating fixture 401 which rotates at an angle a in a vertical plane, a plane that approximately contains the liquid flow direction, rotating fixture connected to one or more active elements such as doors or gate leaves 403 and 404, through joints 405 and 406 and then through the rotating element of the central axis of rotation 402 which rotates vertically relative to the gate, able to activate independently, due to the occurrence in the system of hydraulic forces able to move the gravity center of the gate upstream A or downstream B, causing the gate to fall into one of the "closed" (FIG. 15), or "open" (FIG. 14) positions, which coincide approximately with the ends of movement of the rotating fixture 401 in the vertical plane of the gate.

A two-leaf 403, 404 flood barrier or liquid flow control gate according to the invention may be designed with a central axis of rotation 402 common for both gate leaves, connected to the reference system through the rotating fixture 401, or also with gate leaves placed similar to a "Mitre" gate, that is with one individual axis of rotation for each gate leaf, as shown in patent application US2013/0022402, but with axes of rotation mobile around rotating fixtures through which they are attached to the reference system, in a way similar with Embodiment IV of this document, which refers to an access gate.

A flood barrier or liquid flow control gate is an embodiment of the invention, with the two gate leaves 403 and 404 representing the active elements of the system, provided with an edge M with two points M1 and M2, gate leaves 403 and 404 which open or close by rotating around the axis of rotation of the rotating element 402 in the central area of the gate with an angle b, rotating element which in turn, with the help of the rotating fixture 401 corresponding to point M2, is pivotable around a point of connection to the reference system and has a partial pivoting motion with an angle a described by point M2.

The flood barrier or liquid flow control gate according to the invention is described with reference to FIG. 14, 15, 16, 17a, 17b, 18a, and 18b.

Figure 14:
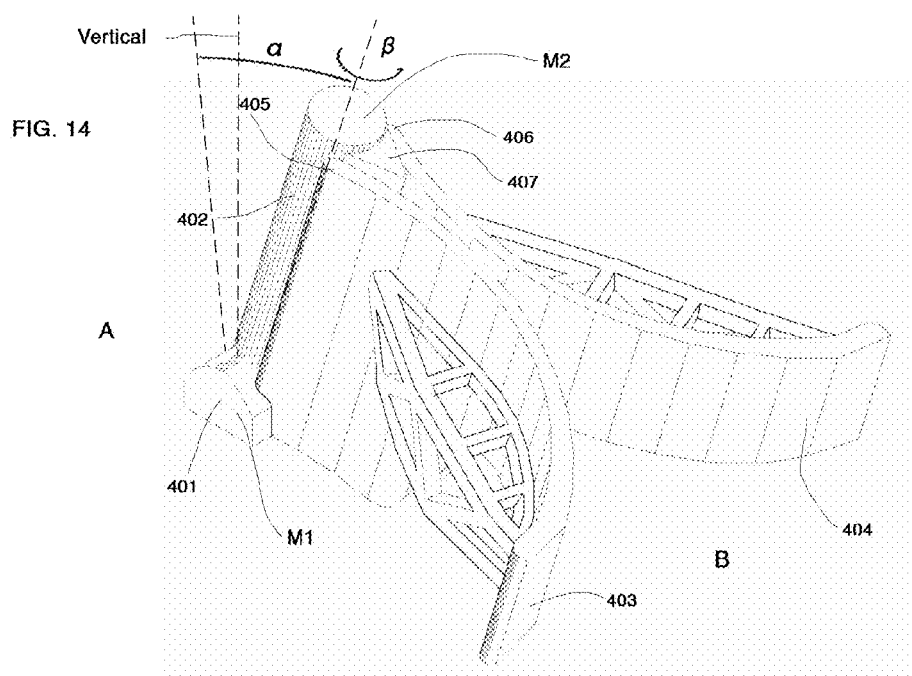
FIG. 14 is a perspective view of a flood barrier gate according to an embodiment of the invention, in an "open" position.

FIG. 14 is an overview of the flood barrier gate according to the invention, in the "open" position.

Figure 15:
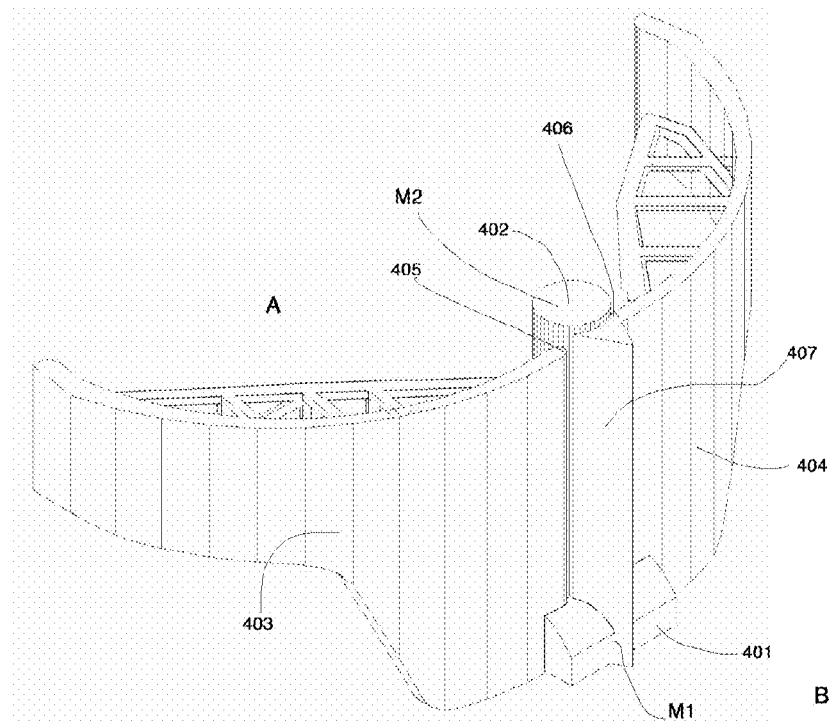
FIG. 15 is a perspective view of the flood barrier gate of FIG. 14, in a "closed" position.

FIG. 15 is an overview of the flood barrier gate according to the invention, in the "closed" position.

FIG. 16 is a top view of the flood barrier gate according to the invention, in the "open" position. When the forces developed by water flow from zone B towards zone A exceed the permitted levels, the gate pivots to the "closed" position, described in FIG. 16 with dotted lines.

FIG. 17a represents a perspective view from zone B of the flood barrier gate according to the invention, in the "open" position.

FIG. 17b represents a perspective view from zone B of the flood barrier gate according to the invention, in the "closed" position.

FIG. 18a represents a perspective view of zone A of the flood barrier gate according to the invention, in the "open" position.

FIG. 18b represents a perspective view from zone A of the flood barrier gate according to the invention, in the "closed" position.

The notation of the elements in the drawings represents:
A: the area considered to be upstream or behind the gate
B: the area considered to be downstream or in front of the gate
401: rotating fixture of the rotating element 402 of the gate, points M1 and M2 of the edge M
402: the rotating element
403: the right gate leaf of the gate
404: the left gate leaf of the gate
405: the hinge-shaped joint connecting the right gate leaf of the gate to the central rotating element 401
406: the hinge-shaped joint, which connects the left gate leaf of the gate to the central rotating element 401
407: longitudinal stop limiting the movement of the hinges 405 and 406
a: the pivoting angle and b the angle of rotation The shape of the gate leaves 403 and 404 is designed so that in the case of a normal water level, the gate is in the "open" position as shown in FIG. 14 and maintain a relatively hydrodynamic shape, with the gate leaves 403 and 404 close together, not obstructing the normal water flow.

To increase resistance against water forces, the gate leaves 403 and 404 preferably have an arc-shaped cross section. The upper area of each gate leaf preferably has a longer length than the lower area, which together with the arc-shape, generates a flared area in the upper extremities, which gradually decreases the hydrodynamic coefficient of the entire system, increasing sensitivity to water forces as the level water rises.

When a significant volume of water comes forcefully from downstream B and there is a risk of flooding areas outside the normal watercourse upstream A, this volume of water pushes upstream A the flared area of gate leaves 403 and 404 hitherto above the water, forcing the central rotating element 402 to pivot around the rotating fixture 401 towards upstream A, moving the center of gravity of the whole flood barrier gate upstream A relative to the rotating fixture to the reference system 401.

This leads to the natural tendency of both gate leaves to fall into the "closed" position, with the ends of the gate leaves 403 and 404 resting upon the banks and the rotating element coinciding to the central axis of rotation 402 sloping upstream A.

The higher the water force from downstream B towards upstream A, the stronger the gate will be pushed into the "closed" position.

For situations in which the water currents are not stable in terms of direction, the central axis 402 of the flood barrier gate may be provided with a longitudinal stop 406, which in addition to the hydrodynamic role, has the function of not allowing any of the gate leaves 403 or 404 to close over the other leaf, in case of the presence in the system of some lateral forces that would prevent the proper closing of the gate, each gate leaf in the corresponding direction.

For a high degree of responsiveness of the flood barrier gate according to the invention, lever systems with counterweights can be attached to it in order to adjust the equilibrium sensitivity, or simple hydraulic systems such as propellers, hydraulic ramps etc. can be built, at greater distances downstream B from the gate, systems able to actuate the flood barrier gate remotely, through cable systems, pulleys, etc. before a massive excess water flow endangers the areas to be protected.

Depending on the geographical context and needs, variations of the flood barrier gate according to the invention may be disposed at river mouths in places where they connect to larger rivers, lakes, seas or oceans, waters characterized by the ability to flood meadows, deltas, estuaries or other forms of relief near the mouths. Also, to regulate the flow or force of water currents, gates according to the invention can be installed along rivers as dams or mobile valves, or even disposed so they protect coastal areas.

The problem solved by the invention is the production of a flood barrier or liquid flow control gate that acts independently, quickly, completely mechanically and self-powered, without the need for a human or computerized control center, able to protect an area against floods, in extreme situations such as power surge, control systems destroyed or non-existent infrastructure, diminishing the impact of water flow coming from downstream B to upstream A, by redirecting water forces towards the bottom of the water and to the banks.

At the same time, the utility of the flood barrier gate according to the invention is further greater, as it works completely ecologically and offers the possibility to be designed in a form that does not impede the navigability of the watercourse where it is built.

Access Gate

Some embodiments relate to an access gate comprising a vertically rotating fixture 503 connected to one or more gate leaves or access doors 501 through one or more joints with the rotating element 502 which is vertical relative to the door, enabling it to open and close quickly and with minimal energy consumption by changing its center of gravity, which determines the tendency of the door to fall into one of the "open" or "closed" positions, which coincide approximately with the ends of the movement of the fixture 503 in the vertical plane of the access gate.

The access gate represents an embodiment of the invention, with a door 501 representing the active element of the system, provided with an edge M with two points M1 and M2, a door that opens or closes by rotation with an angle b around the axis of rotation 502 of the joint in the area of the column of the gate 505, axis of rotation which in turn, with the help of the rotating fixture 503, has a partial pivoting movement, with an angle a around a point of connection to the reference system. The access gate according to the invention is described with reference to FIGS. 19, 20, 21, 22, 23, 24, 25, and 26.

Figure 19:
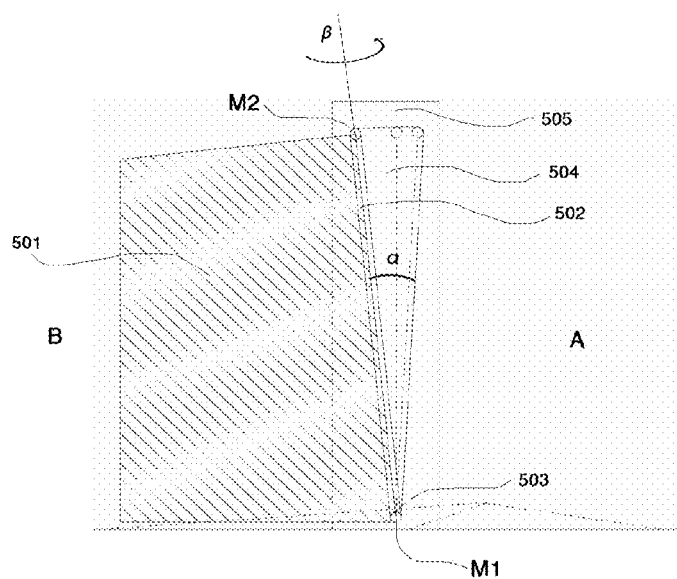
FIG. 19 is a schematic view of an access gate according to an embodiment of the invention, with the door in an "open" position.

FIG. 19 is a schematic view of an access gate according to the invention, with the door in the "open" position.

Figure 20:
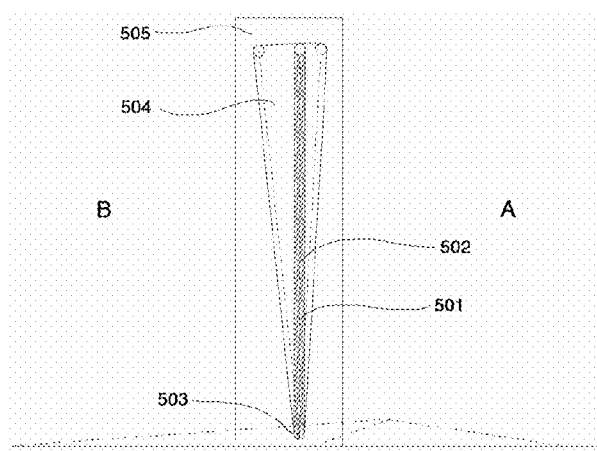
FIG. 20 is a schematic view of the access gate of FIG. 19, with the door in an unstable equilibrium position on a trajectory between "open" and "closed" positions.

FIG. 20 is a schematic view of an access gate according to the invention, with the door in the unstable equilibrium position on the trajectory between the "open" and "closed" positions.

Figure 21:
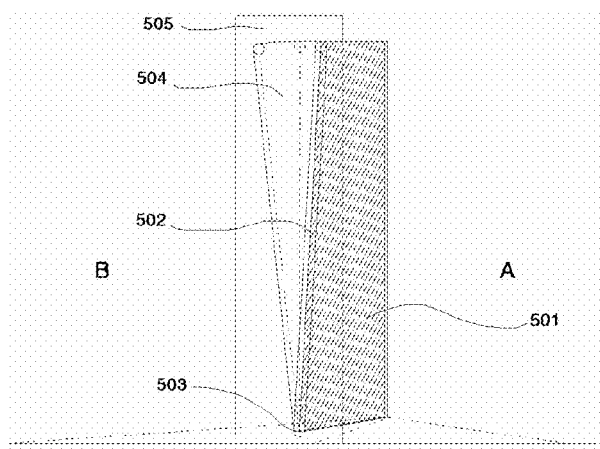
FIG. 21 is a schematic view of the access gate of FIG. 19, with the door in the "closed" position.

FIG. 21 is a schematic view of an access gate according to the invention, with the door in the "closed" position.

Figure 22:
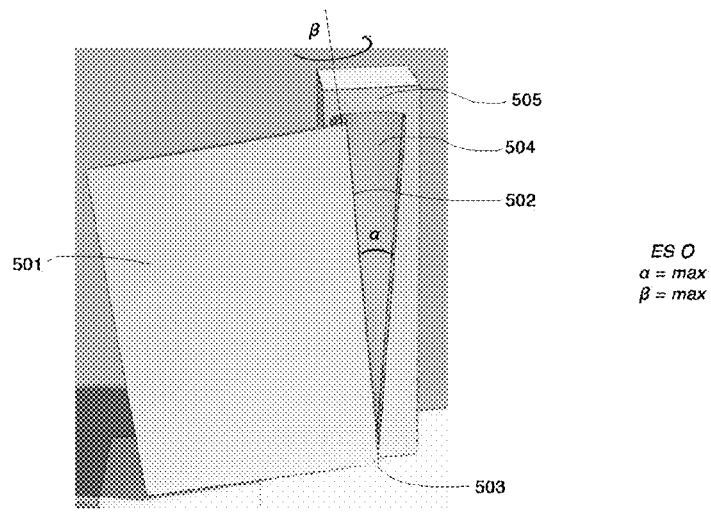
FIG. 22 is a perspective view of the access gate of FIG. 19, with the door in the "open" position.

FIG. 22 is a perspective view of an access gate according to the invention, with the door in the "open" position.

Figure 23:
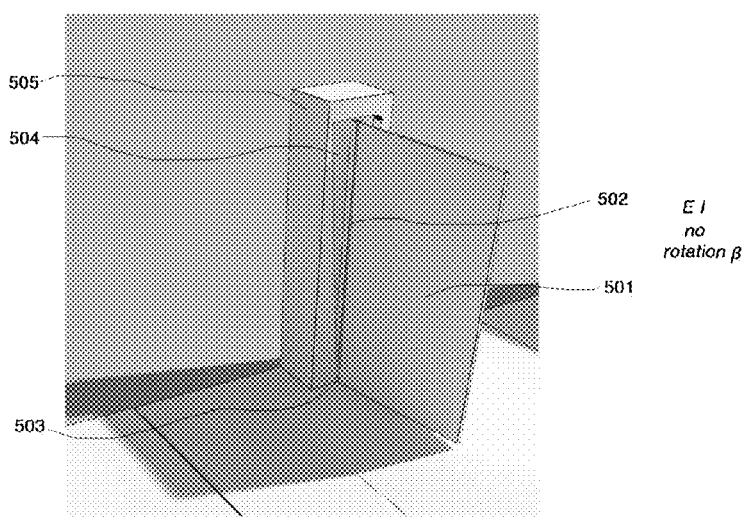
FIG. 23 is a perspective view of the access gate of FIG. 19, with the door in the unstable equilibrium position on the trajectory between the "open" and "closed" positions.

FIG. 23 is a perspective view of an access gate according to the invention, with the door in the unstable equilibrium position on the trajectory between the "open" and "closed" positions.

Figure 24:
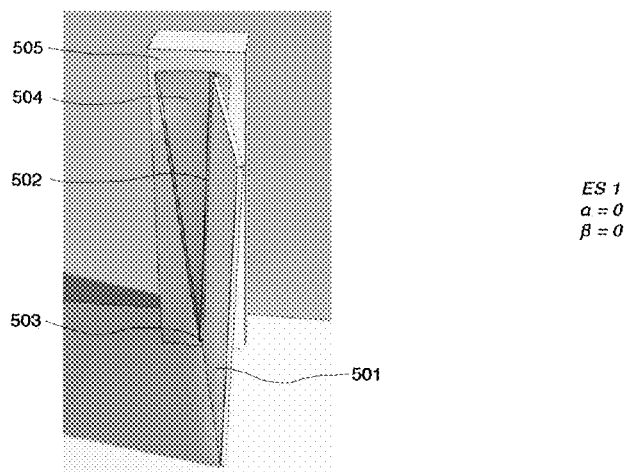
FIG. 24 is a perspective view of the access gate of FIG. 19, with the door in the "closed" position.

FIG. 24 is a perspective view of an access gate according to the invention, with the door in the "closed" position.

Figure 25:
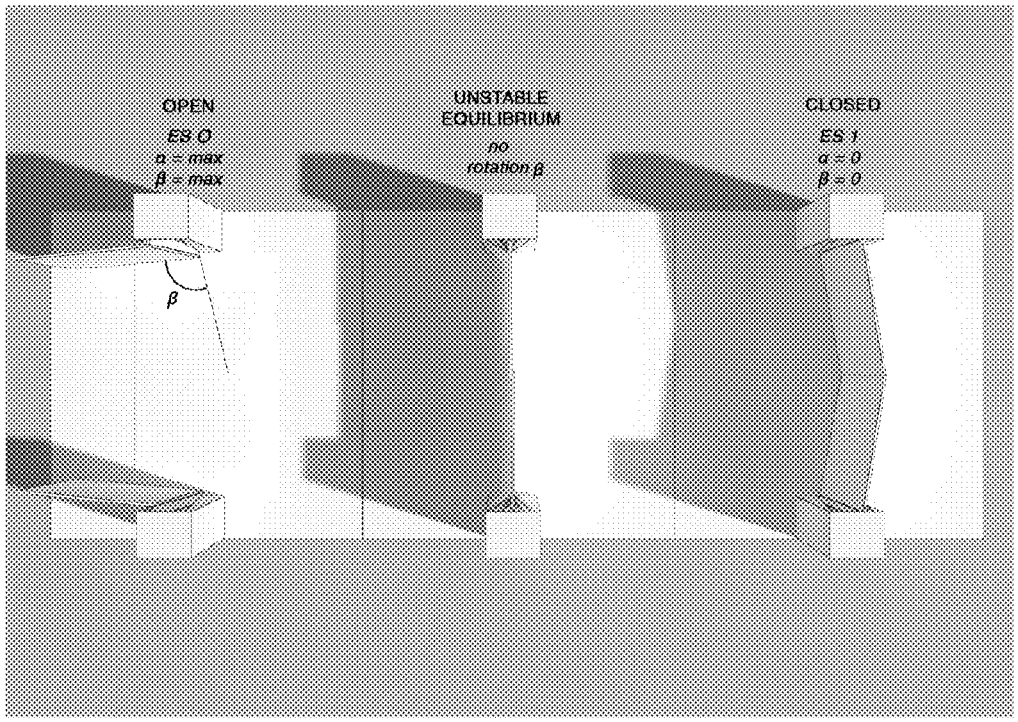
FIG. 25 is a perspective view, from above, of three identical access gates according to an embodiment, with two doors each, the gate on the left with the doors in the "open" position, the one in the middle with the doors in the unstable equilibrium position on the trajectory between the "open" and "closed" positions, and the one on the right with the doors in the "closed" position.

FIG. 25 represents a perspective view, from above, of three identical access gates according to the invention, with two doors each, the gate on the left with the doors in the "open" position, the one in the middle with the doors in the unstable equilibrium position on the trajectory between the "open" and "closed" positions, and the one on the right with the doors in the "closed" position.

Figure 26:
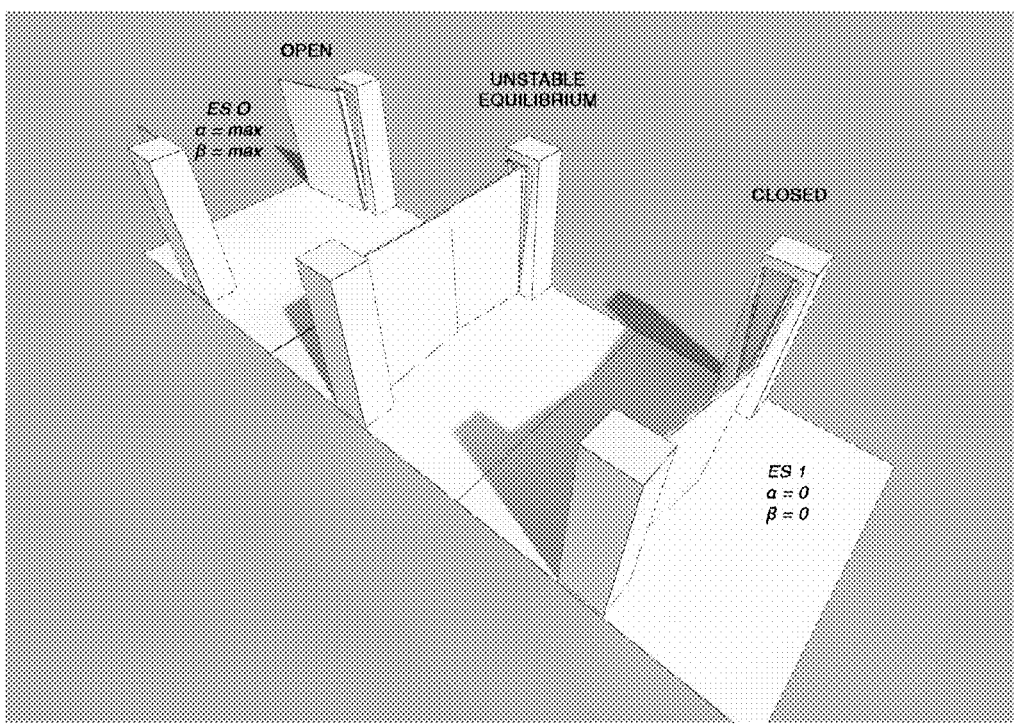
FIG. 26 is a perspective view of three identical access gates according to the invention, with two doors each, the one on the top left (behind) located with the doors in the "open" position, the one in the middle (medium distance) with the doors in the position of unstable equilibrium on the trajectory between the "open" and "closed" positions, and the one on the lower right (close-up) with the doors in the "closed" position.
Figure 27:
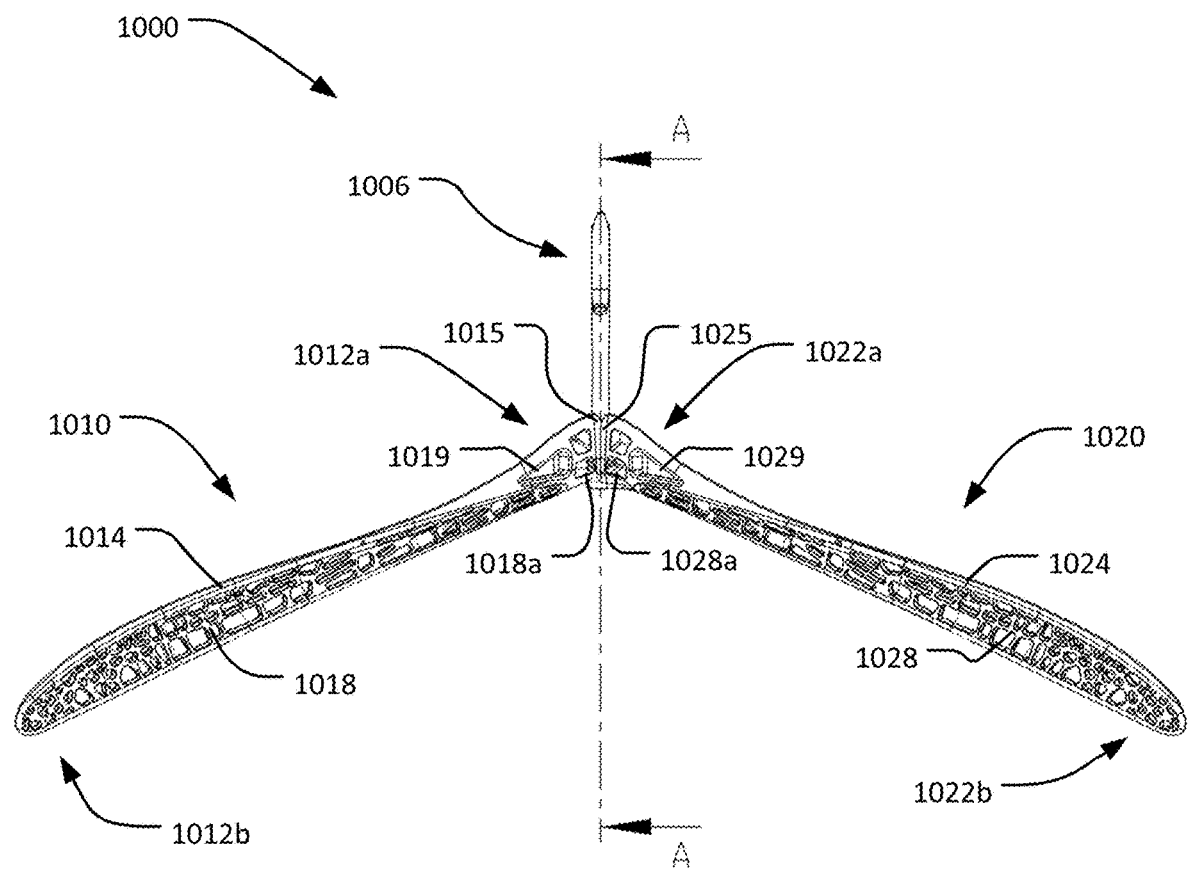
FIG. 27 is a front view of a foldable hanger 1000 according to another embodiment of the current invention, shown in an extended configuration.

FIG. 26 represents a perspective view of three identical access gates according to the invention, with two doors each, the one on the top left (behind) located with the doors in the "open" position, the one in the middle (medium distance) with the doors in the position of unstable equilibrium on the trajectory between the "open" and "closed" positions, and the one on the lower right (close-up) with the doors in the "closed" position.

The notation of the elements in the drawings represents:
A: the area considered to be in front of the access gate
B: the area considered to be behind the access gate
501: the gate door provided with the edge M with points M1 and M2
502: the rotating element coinciding with the axis of rotation of the gate door, vertical relative to the door
503: rotating fixture to the reference system of the rotating element 502
504: cavity inside the pillar 505 of the gate, which houses the double articulated system according to the invention and limits the pivoting angle of the element of rotation 502 around the rotating fixture 503 to the path necessary and sufficient for the proper operation of the system
505: the gate pillar, which houses the operation of the double articulated system that underlies the operation of the access gate according to the invention
a: the pivoting angle
b: the rotation angle As the doors of prior art access gates are generally very heavy, closing and opening them requires a relatively large human effort or strong engines in terms of the force developed. Space limitations in the case of automated access gates often lead to the decision to install engines of relatively small size and power, which leads to a very slow transition of the gate from one operating stage to another, such as from "closed" to "open" or vice versa.

By building a pillar 505 according to the disclosed concepts, which is either rotationally mobile or contains a system 504 which allows the vertical rotation of the rotating element 502 to which the gate door 501 is attached, around a rotating fixture 503 by means of which it is connected to the reference system, the movement of the door between the "closed" and "open" positions can be achieved mainly under the own weight of the door, the energy consumption necessary to operate the gate being equivalent only to the effort of removing the gate from a stable equilibrium and passing it over the unstable equilibrium point in which the axis of rotation 502 of the door is in a vertical position, the gate having by construction the capacity to continue autonomously the pivot of the axis 502 and rotation of the door toward the expected stable equilibrium point equivalent to the desired operating stage.

In order to minimize the energy consumed for actuation, the access gate according to the invention may comprise lever and/or counterweight systems for balancing or for fine tuning its sensitivity, by adjusting the forces that maintain the equilibrium state of the device.

If, for the sake of minimizing energy consumption, the access gate has reached a point of equilibrium in which it presents the risk to become accidentally actuated by forces unforeseen in the system, such as wind breeze, as well as for security reasons, it is possible to opt for the displacement of locks or automated locking systems in the vicinity of the gate doors.

The manual or motorized movement of the upper end of the axis of rotation 502 on an arc-shaped path with the center coinciding with the center of the rotating fixture 503 and the radius equal to the height of the axis 502 from the front of the gate A to the area behind the gate B, after exceeding the unstable equilibrium point in which the axis of rotation 502 is in a vertical position, is equivalent to horizontally moving the center of gravity of the device away from its rotating fixture to the reference system to the rear B, so that the gate door according to the invention tends to fall into the "open" position illustrated in FIG. 19 and FIG. 22, since it represents the stable equilibrium point close to the direction in which the center of gravity is directed in relation to the point of attachment to the reference system 503.

Similarly, the manual or motorized movement of the upper end of the axis of rotation 502 on an arc-shaped trajectory with the center coinciding with the center of the rotating fixture 503 and the radius equal to the height of the axis 502 from behind the gate B to the area in front of the gate A, after passing the point of unstable equilibrium in which the axis of rotation 502 is in a vertical position, is equivalent to horizontally moving the center of gravity away from its rotating fixture to the reference system to the front A, so that the gate door according to the invention tends to to fall into the "closed" position illustrated in FIG. 21 and FIG. 24, since it represents the stable equilibrium point close to the direction in which the center of gravity of the door 501 is directed in relation to the point of attachment to the reference system 503.

For the situation in which the gate doors according to the invention are constructively so heavy that their fall in one of the stable equilibrium points can produce shocks that may damage either the doors themselves, the locking systems, or any other element of the environment in any way, the access gate according to the invention can be provided with shock absorbers at the ends of movement of the hinges or of the closing elements.

The access gate may be operated with a minimum energy consumption and may pass very quickly from one operating stage to another, such as from "closed" to "open" or vice versa.

At the same time, given the trapezoidal shape of the door 501, the transition from one stage of operation to another produces a slight elevation from the ground of its lower edge M, allowing the opening and closing of the gate regardless of the presence of small obstacles on the ground, such as snow, small stones, spontaneously grown plants or other objects that, in the case of the access gates from prior art, obstruct the rotary movement of the doors.

Hanger

FIGS. 27 through 36D show another folding hanger according to an embodiment 1000, along with various accessories. The hanger 1000 is structured and functions in generally the same way as the hanger described above with reference to FIGS. 2 through 9.

The hanger 1000 has a hinge pin 1002, a hook 1006, a first hanger arm 1010, and a second hanger arm 1020. The hinge pin 1002 has upper and lower ends 1002a, 1002b, and the hook 1006 is operably coupled to the hinge pin upper end 1002a for suspending the hinge pin 1002 (e.g., from a closet pole).

The first hanger arm 1010 has proximal and distal ends 1012a, 1012b and defines a support surface 1014 therebetween, and the proximal end 1012a defines a first stop 1015. A first knuckle 1016 extends from the proximal end 1012a and has a first hole 1017. The second hanger arm 1020 has proximal and distal ends 1022a, 1022b and defines a support surface 1024 therebetween, and the proximal end 1022a defines a second stop 1025. A second knuckle 1026 extends from the proximal end 1022a and has a second hole 1027.

Figure 28:
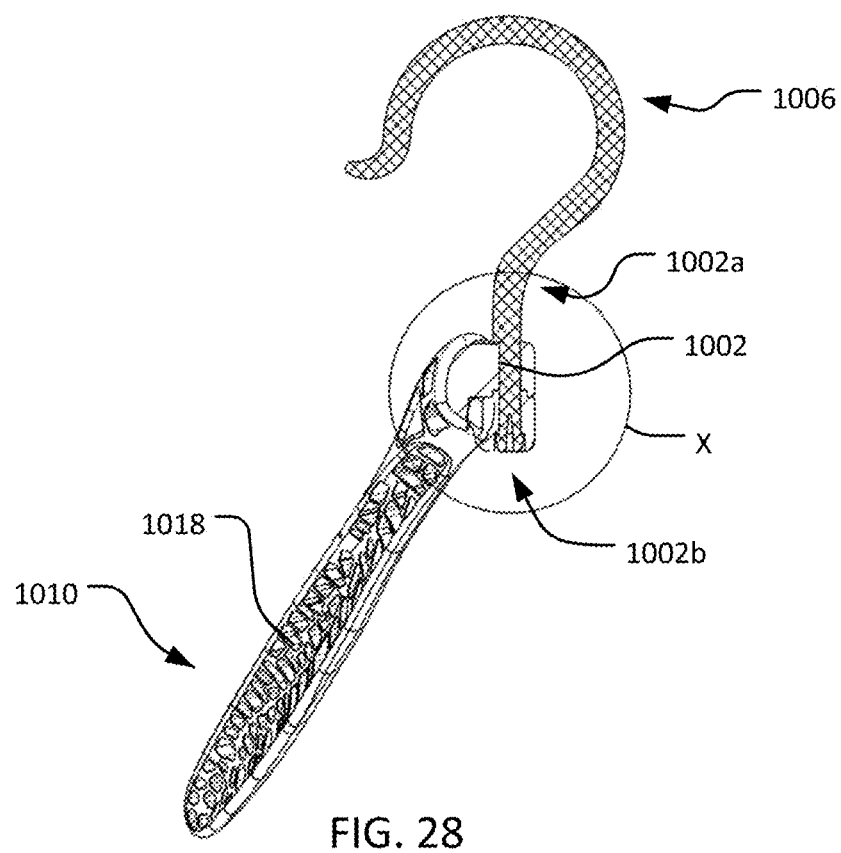
FIG. 28 a section view taken along line A-A in FIG. 27.
Figure 28A:
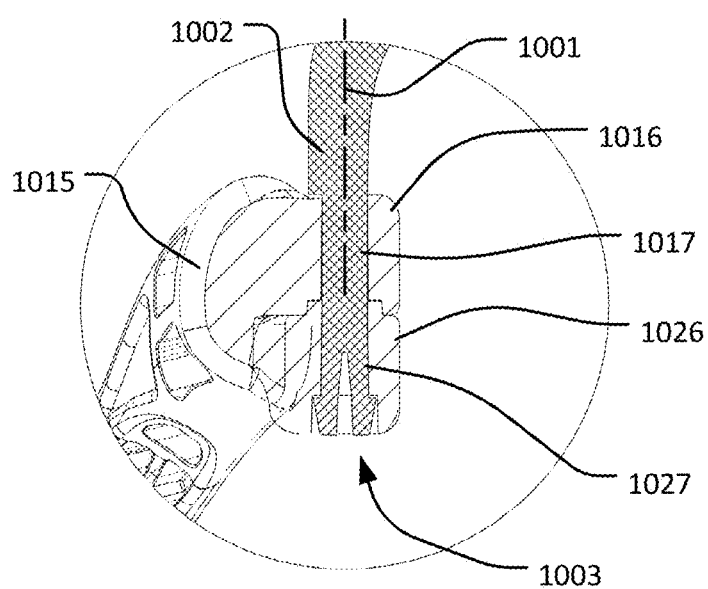
FIG. 28A is a partial view taken from area X in FIG. 28.
Figure 29:
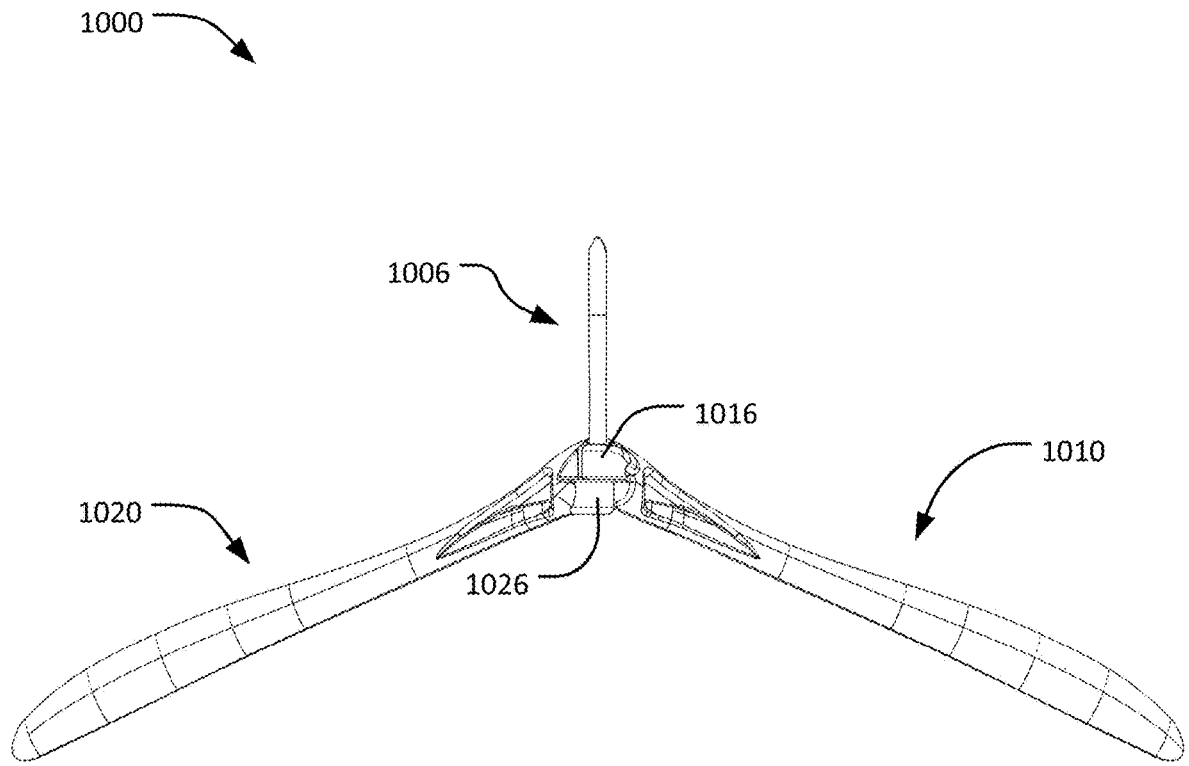
FIG. 29 is a rear view of the hanger of FIG. 27.
Figure 30:
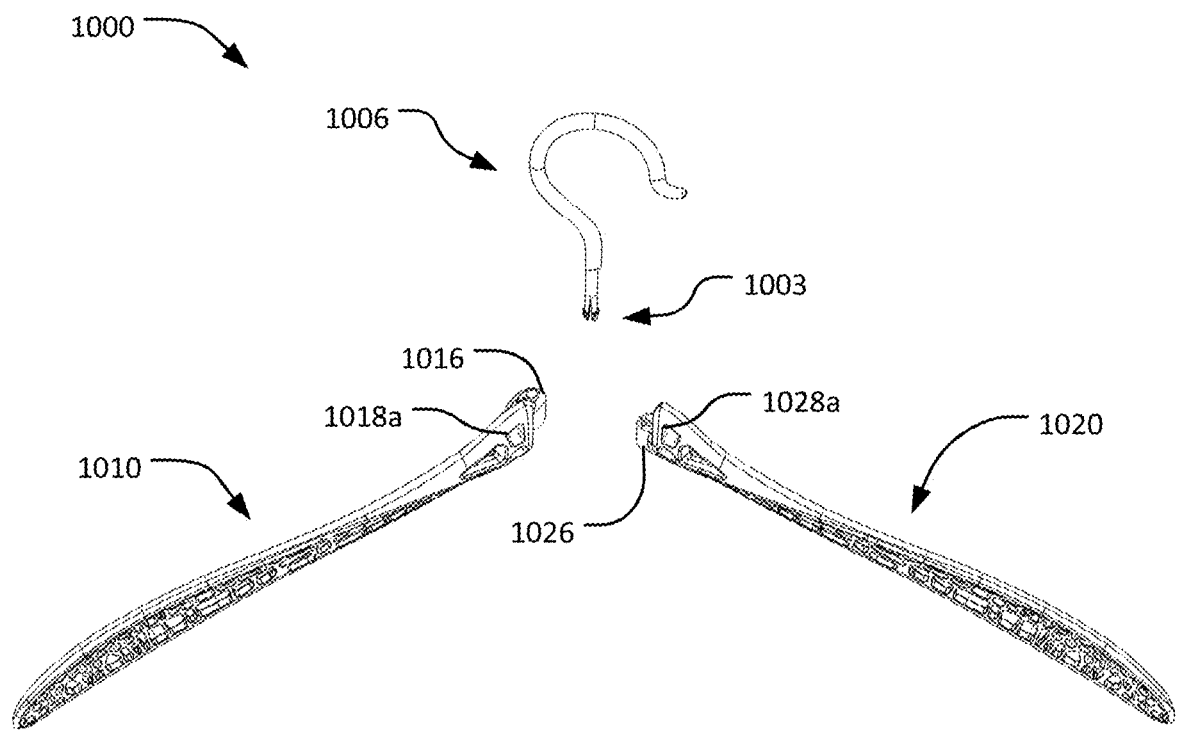
FIG. 30 is an exploded view of the hanger of FIG. 27.
Figure 30A:
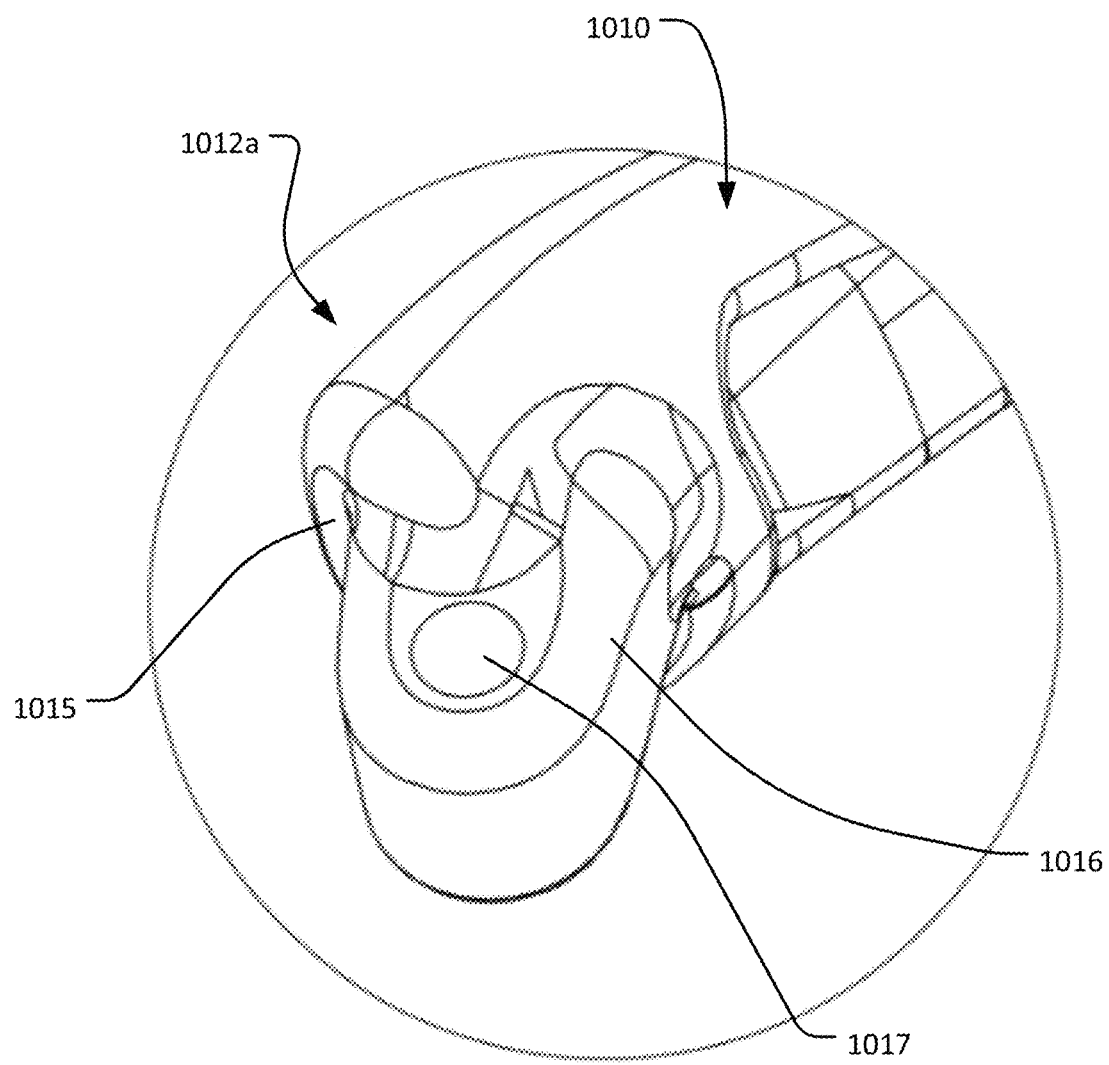
FIG. 30A is a partial view taken from area Y in FIG. 31.
Figure 31:
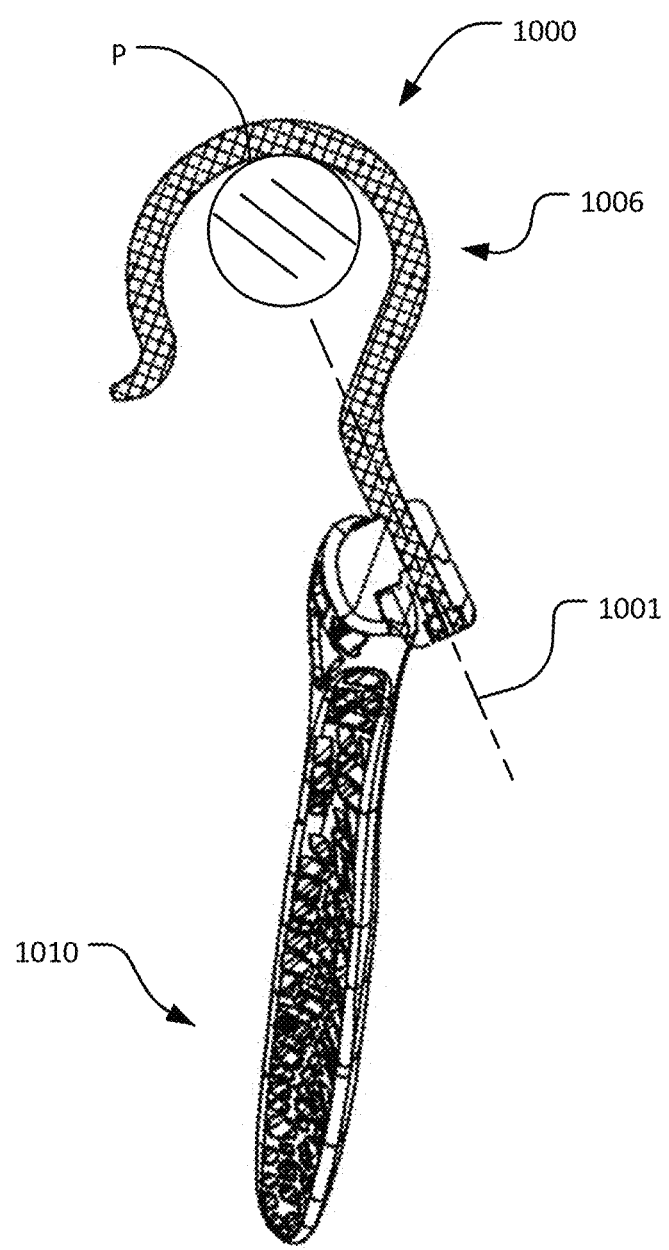
FIG. 31 is a partial view of the hanger of FIG. 27 taken along line A-A in FIG. 27, shown suspended from the hook and at the extended configuration.
Figure 32:
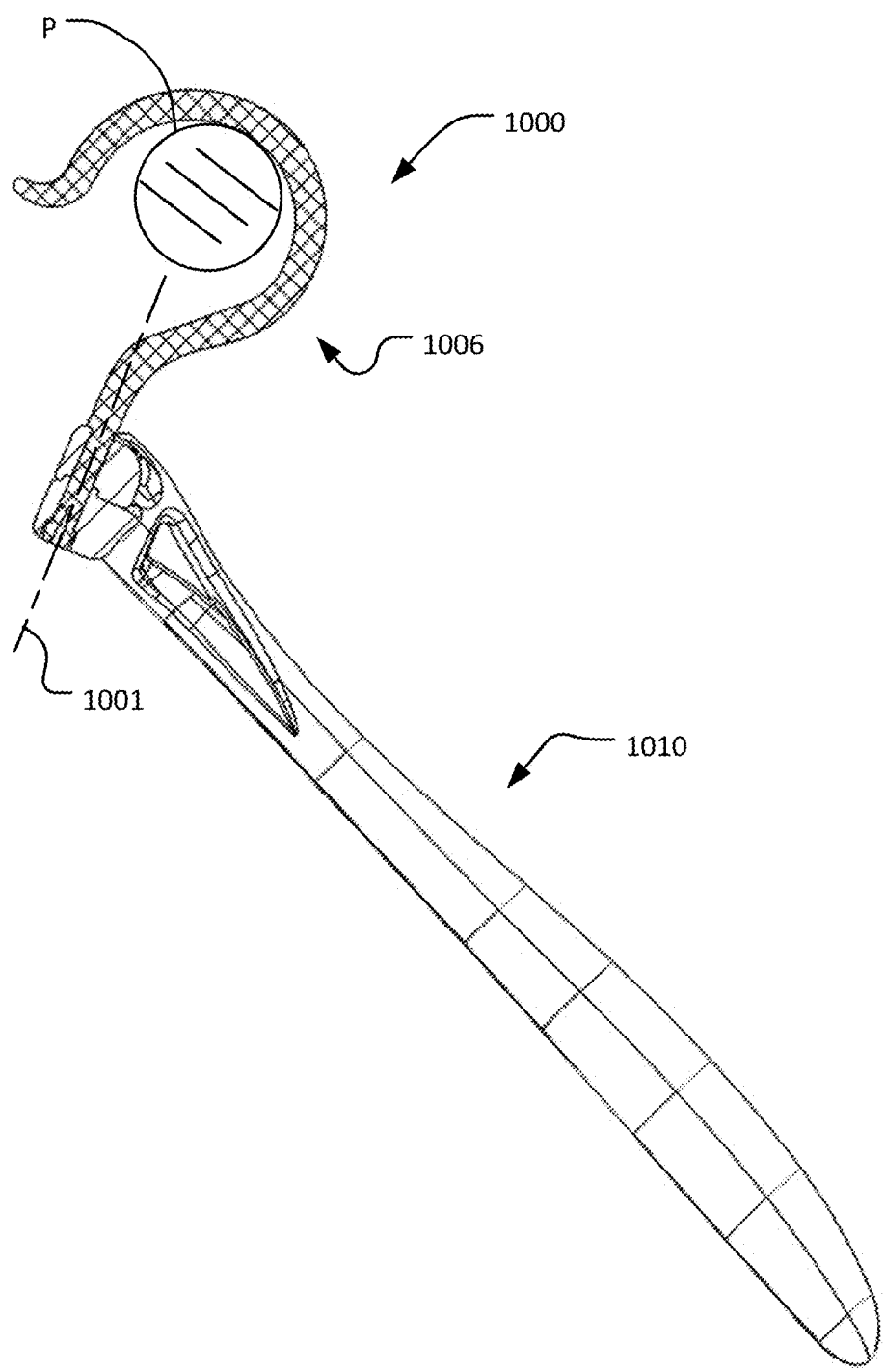
FIG. 32 is a partial view of the hanger of FIG. 27 taken along line A-A in FIG. 27, shown suspended from the hook and at a folded configuration.
Figure 33A:
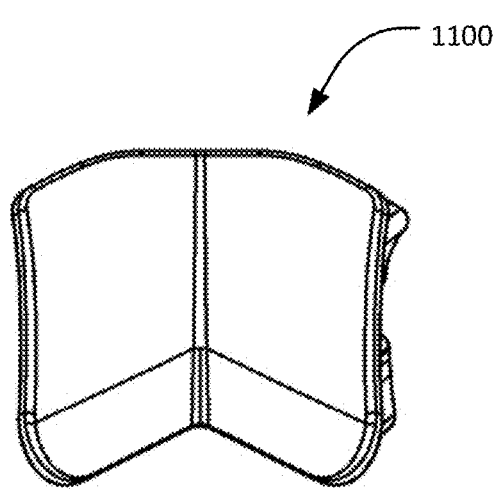
FIG. 33A is a front perspective view of a tightening claw for use with the hanger of FIG. 27.
Figure 33B:
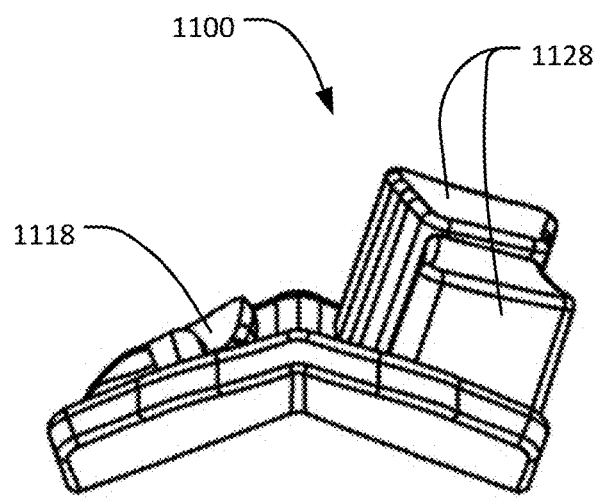
FIG. 33B is a top perspective view of the tightening claw of FIG. 33A.
Figure 33C:
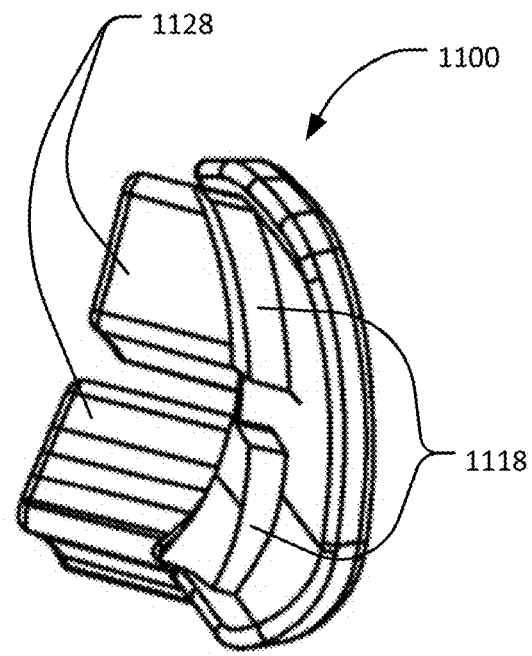
FIG. 33C is a side perspective view of the tightening claw of FIG. 33A.
Figure 33D:
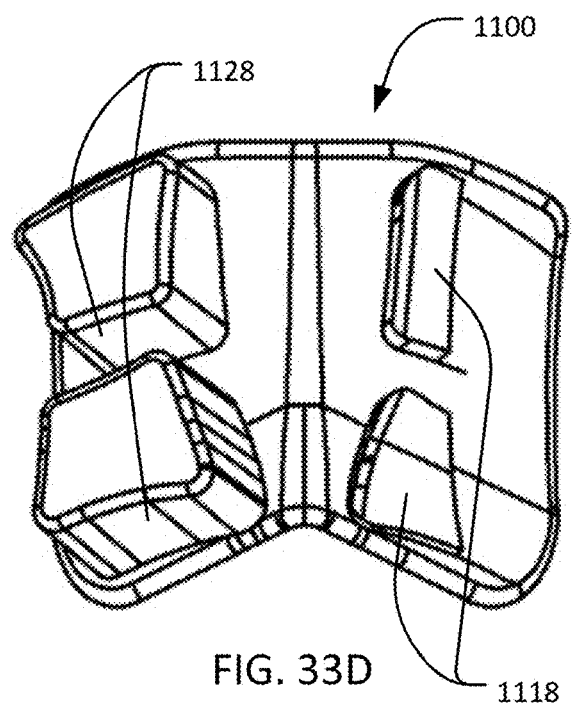
FIG. 33D is a rear perspective view of the tightening claw of FIG. 33A.
Figure 34:
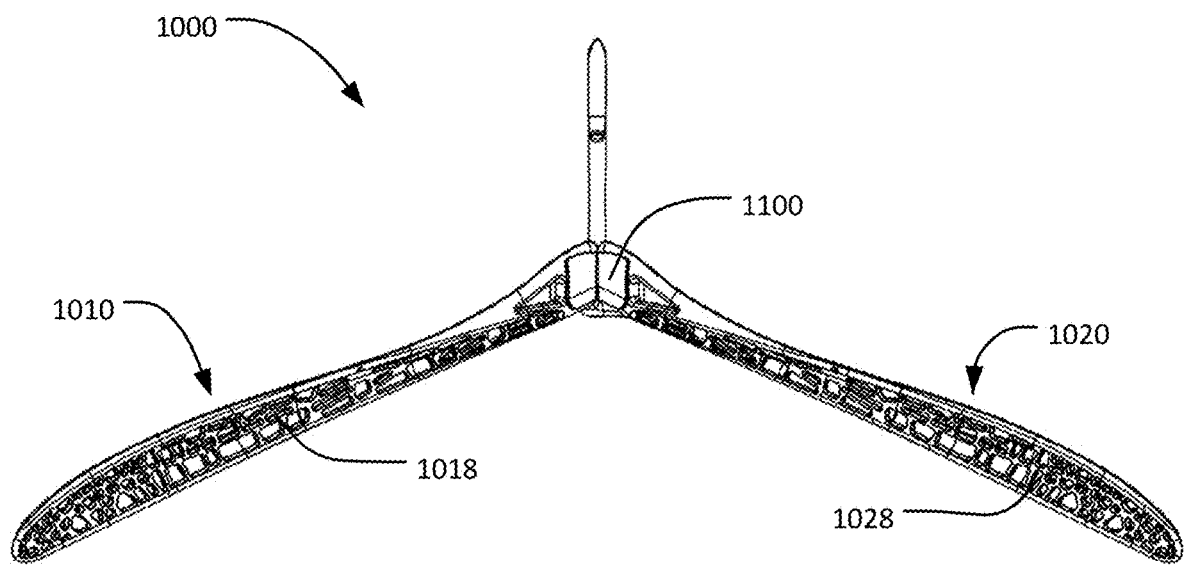
FIG. 34 is a front view of the tightening claw of FIG. 33A in use with the hanger of FIG. 27, shown with the hanger in the extended configuration.
Figure 35:
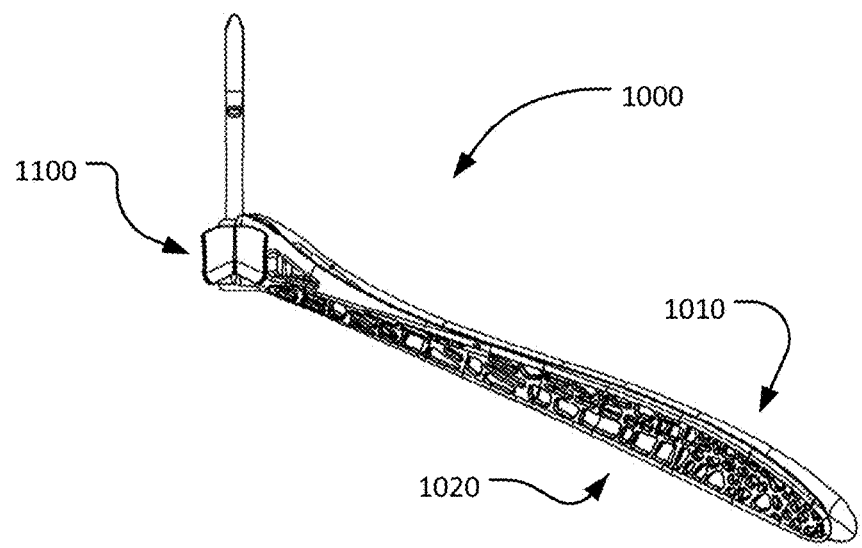
FIG. 35 is a front view of the tightening claw of FIG. 33A in use with the hanger of FIG. 27, shown with the hanger in the folded configuration.
Figure 36A:
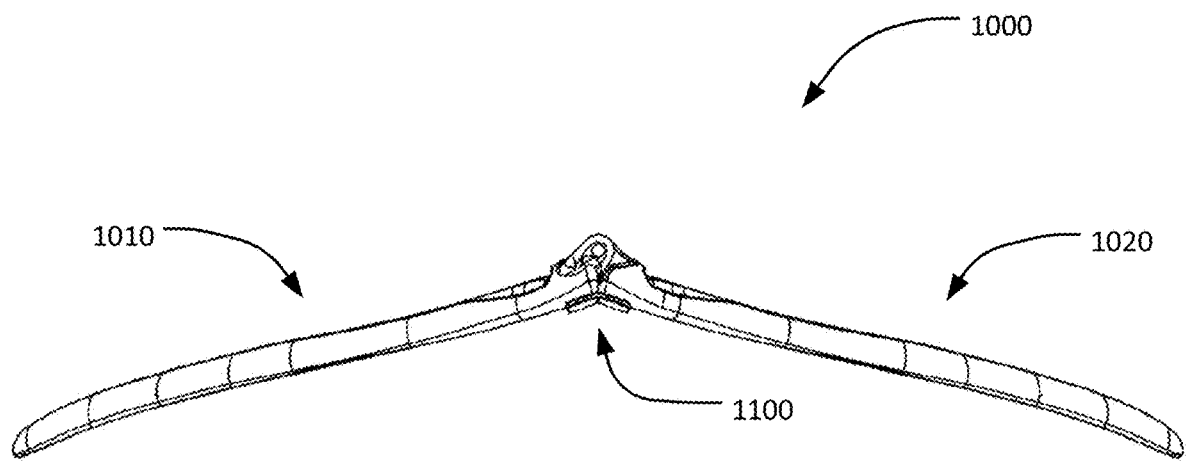
FIG. 36A is a top view of the hanger and tightening claw of FIG. 34, shown with the hanger in the extended configuration.
Figure 36B:
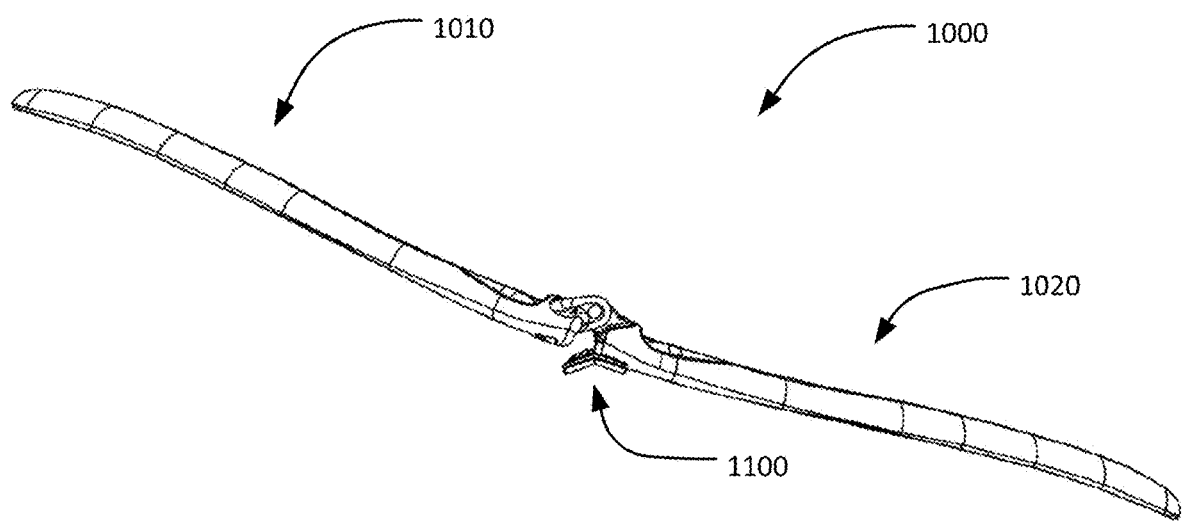
FIGS. 36B and 36C are top views of the hanger and tightening claw of FIG. 34, shown in transitory phases between the extended configuration and the folded configuration.
Figure 36C:
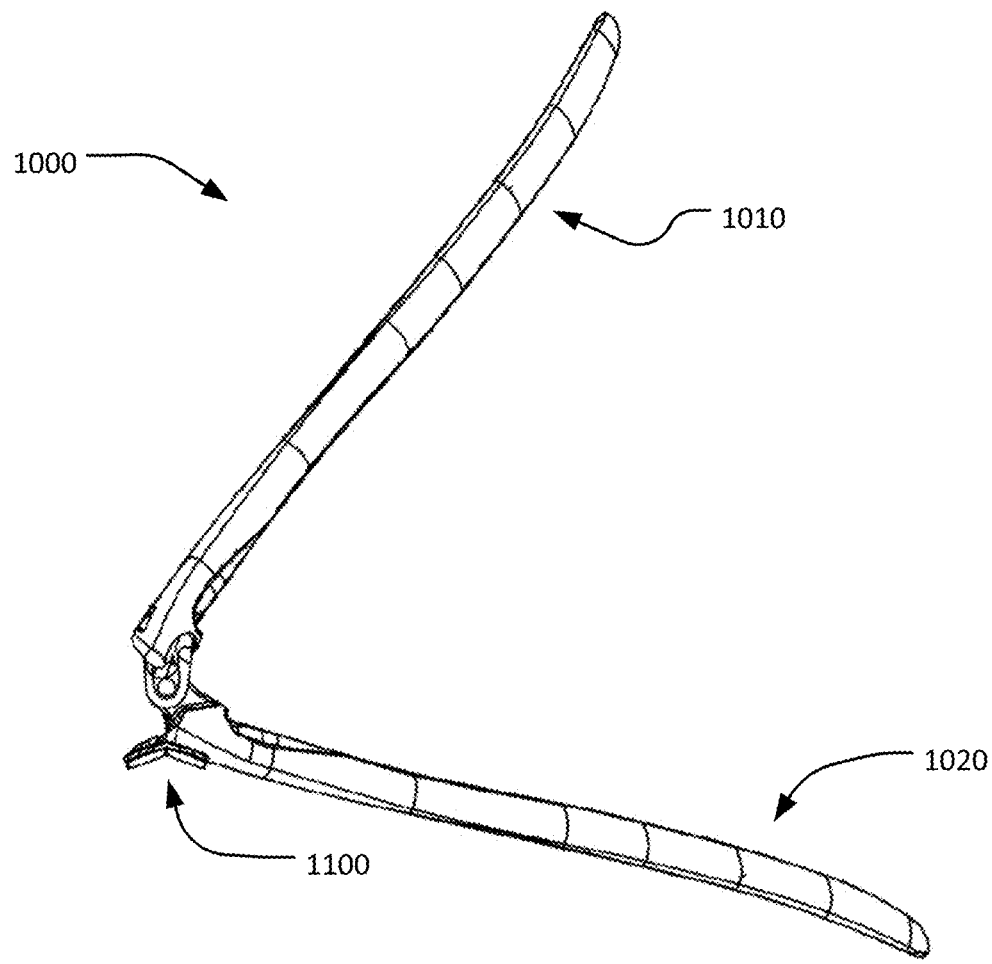
Figure 36D:
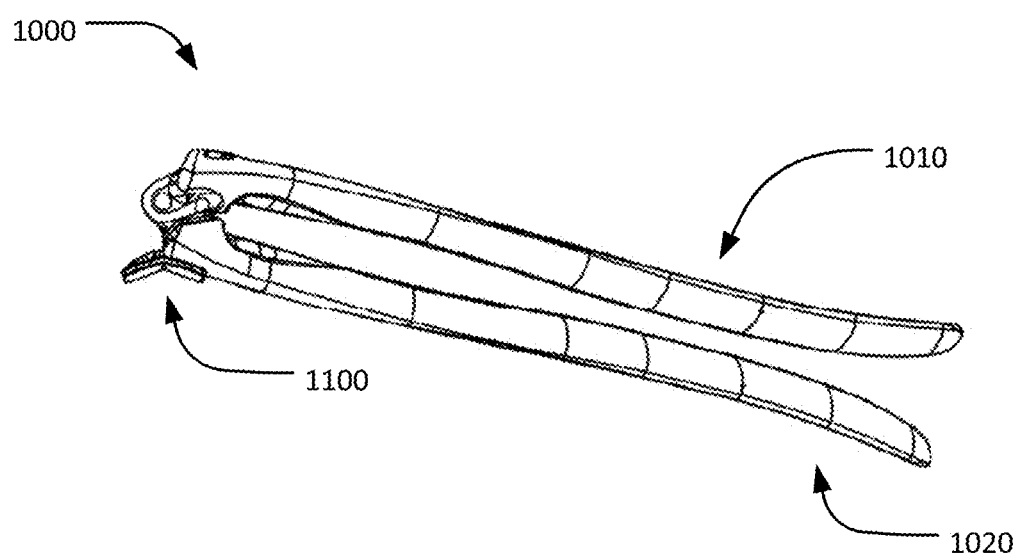
FIG. 36D is a top view of the hanger and tightening claw of FIG. 34, shown with the hanger in the folded configuration.
Figure 37:
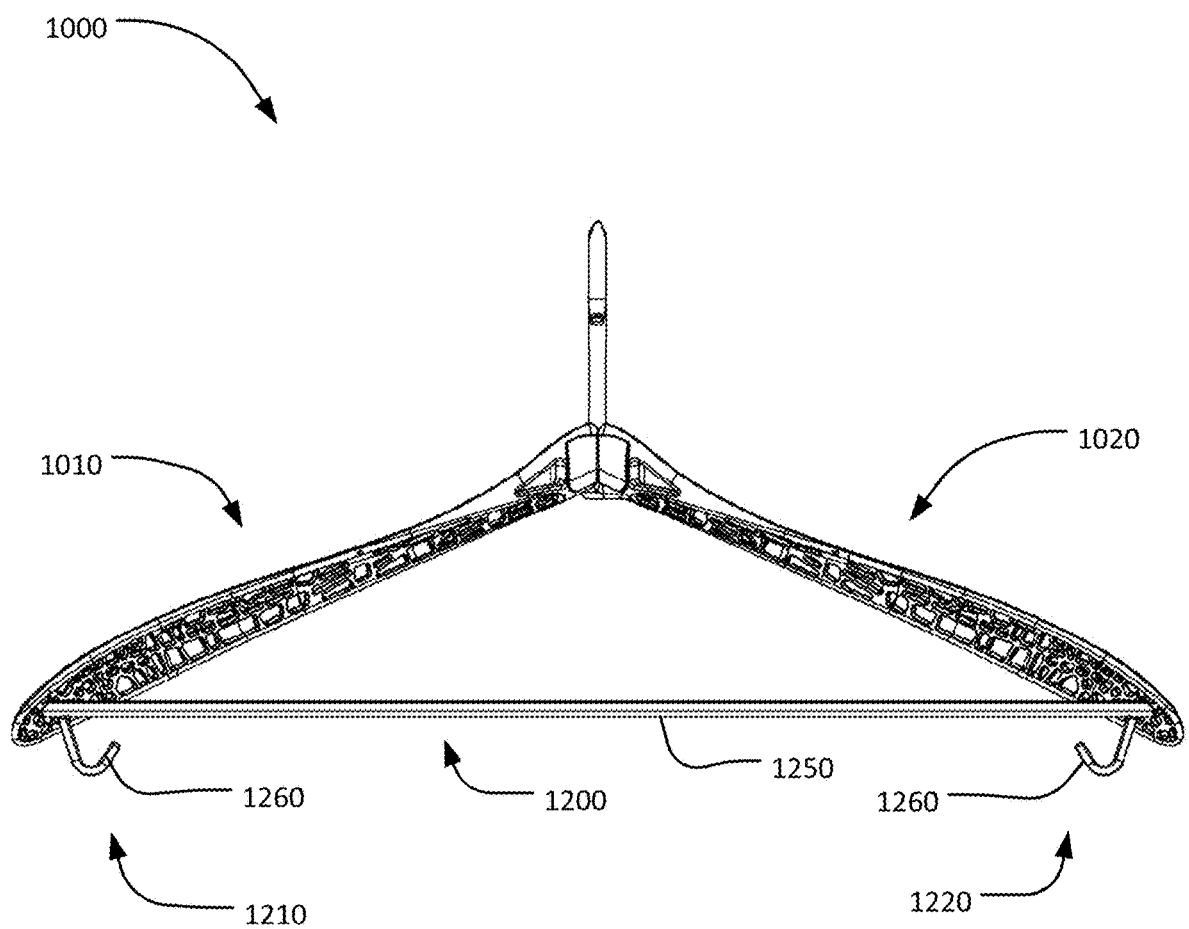
FIG. 37 is a front view of a blocking rod in use with the hanger of FIG. 27, shown with the hanger in the extended configuration.
Figure 38:
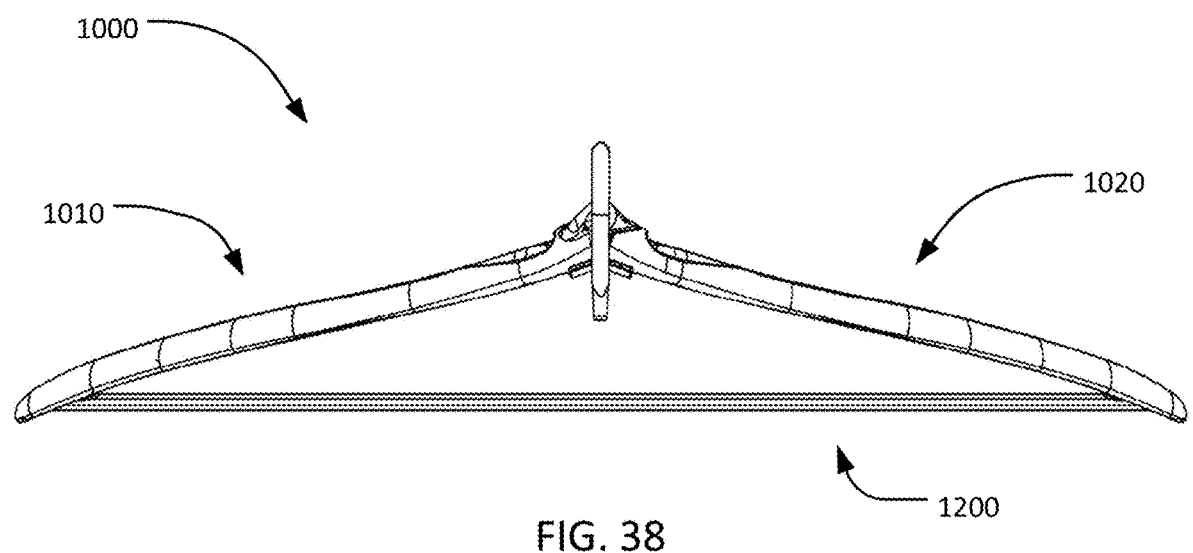
FIG. 38 is a top view of the hanger and blocking rod of FIG. 37, shown with the hanger in the extended configuration.
Figure 38A:
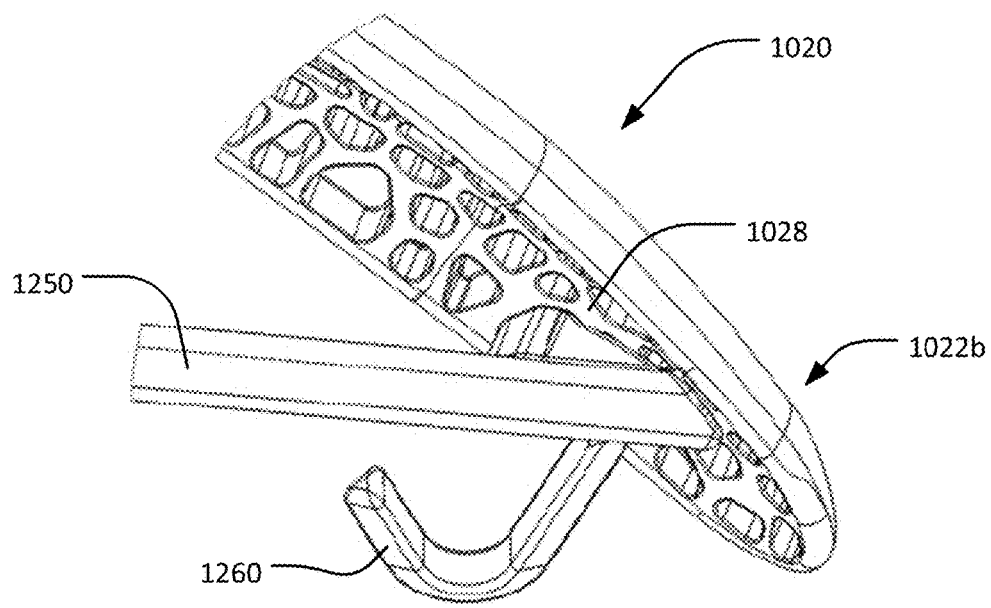
FIG. 38A is a partial view of the hanger and blocking rod of FIG. 37.
Figure 39:
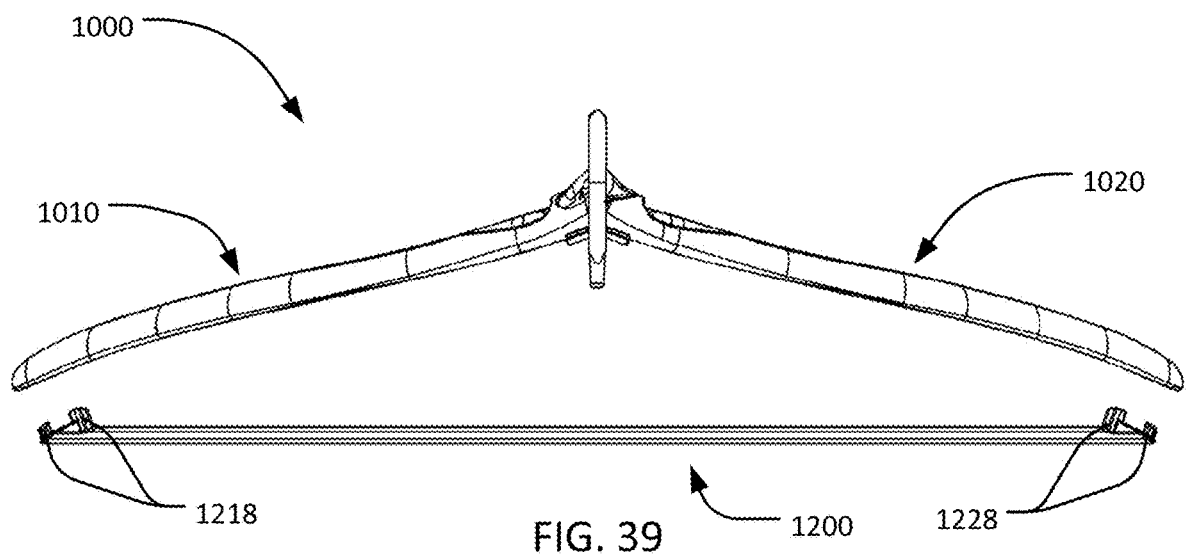
FIG. 39 is an exploded top view of the hanger and blocking rod of FIG. 37, shown with the hanger in the extended configuration.
Figure 39A:
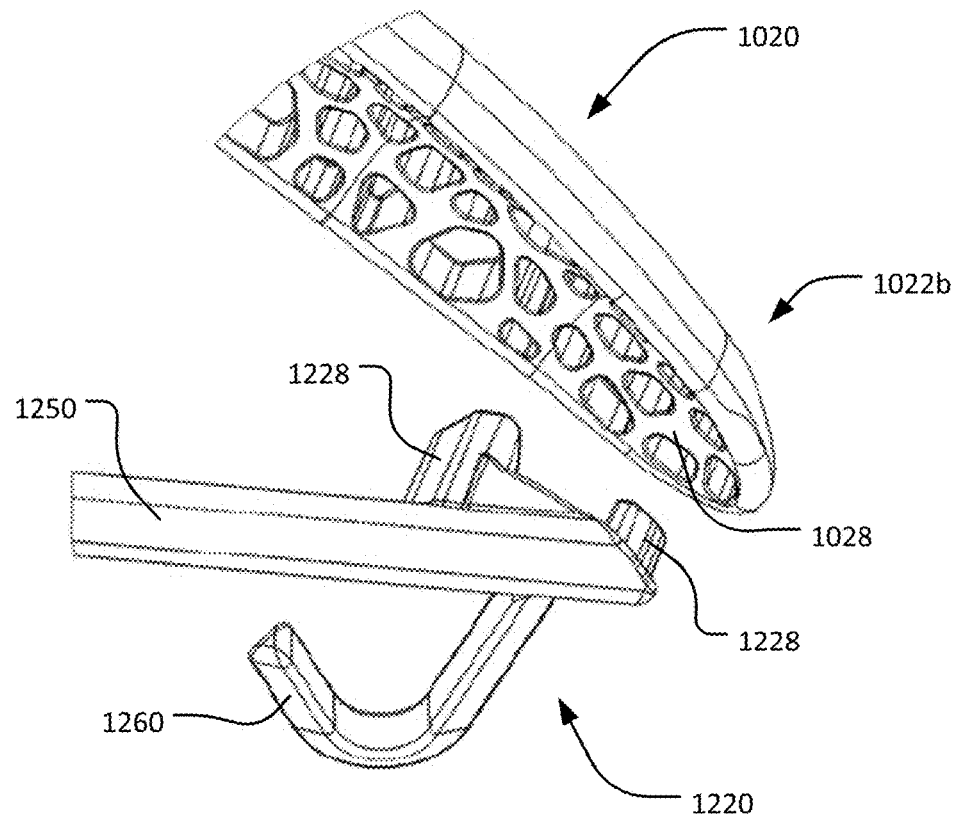
FIG. 39A is a partial exploded view of the hanger and blocking rod of FIG. 37.
Figure 40:
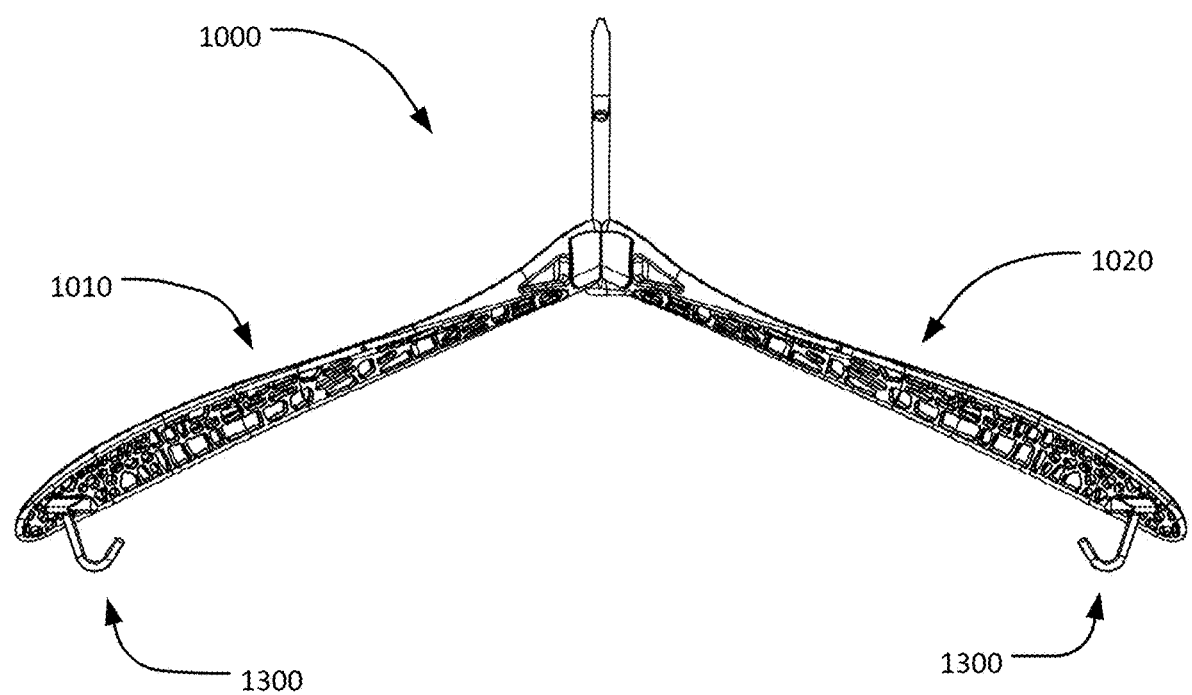
FIG. 40 is a front view of hooks in use with the hanger of FIG. 27, shown with the hanger in the extended configuration.
Figure 41:
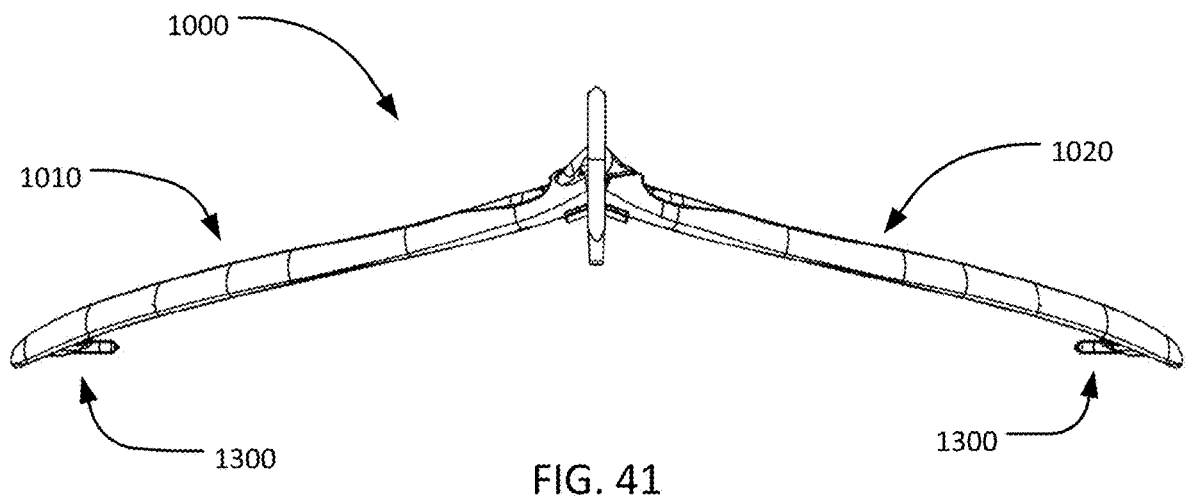
FIG. 41 is a top view of the hanger and hooks of FIG. 40, shown with the hanger in the extended configuration.
Figure 41A:
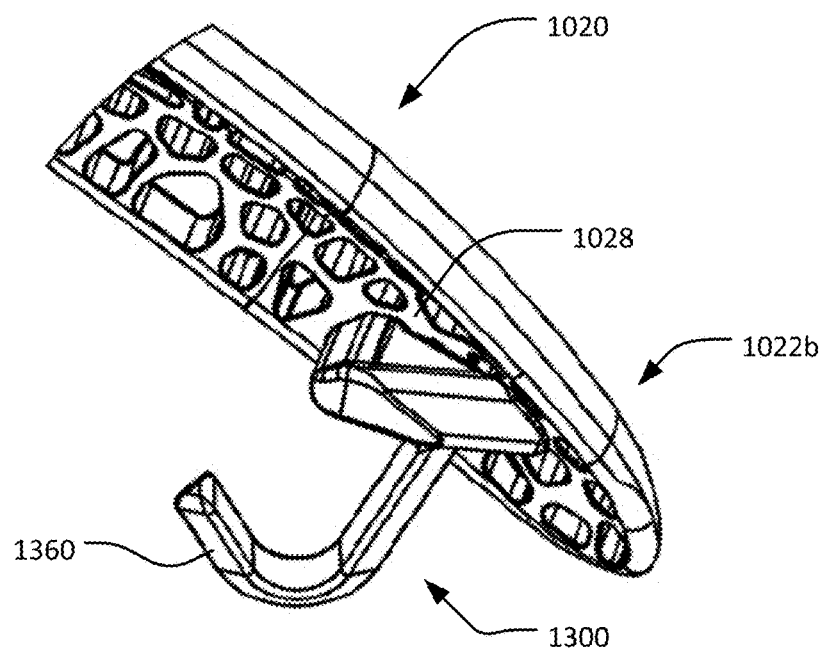
FIG. 41A is a partial view of the hanger and hooks of FIG. 41.
Figure 42:
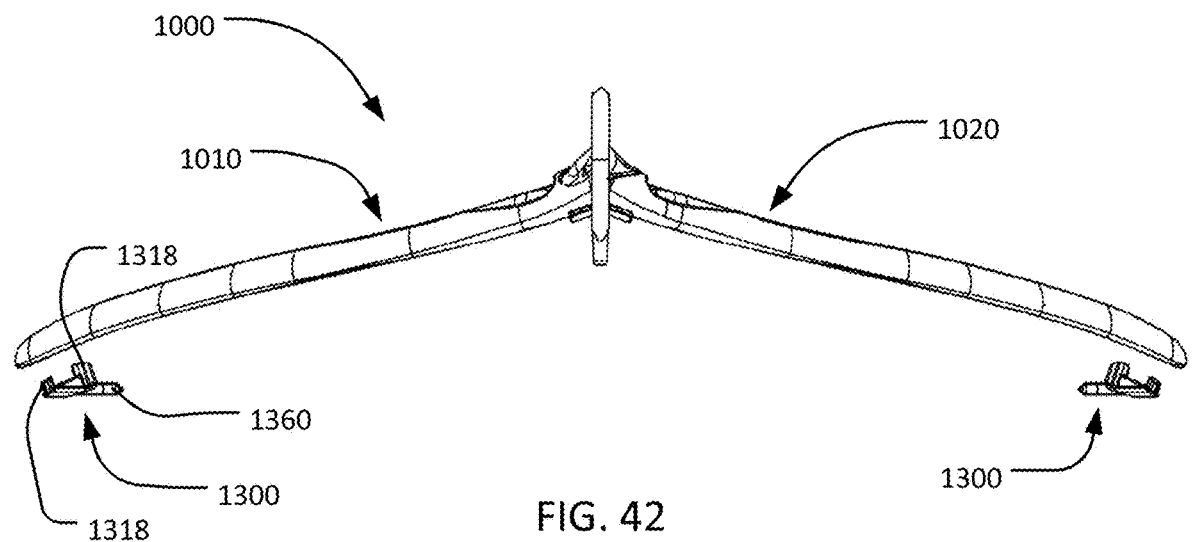
FIG. 42 is an exploded top view of the hanger and hooks of FIG. 41, shown with the hanger in the extended configuration.
Figure 42A:
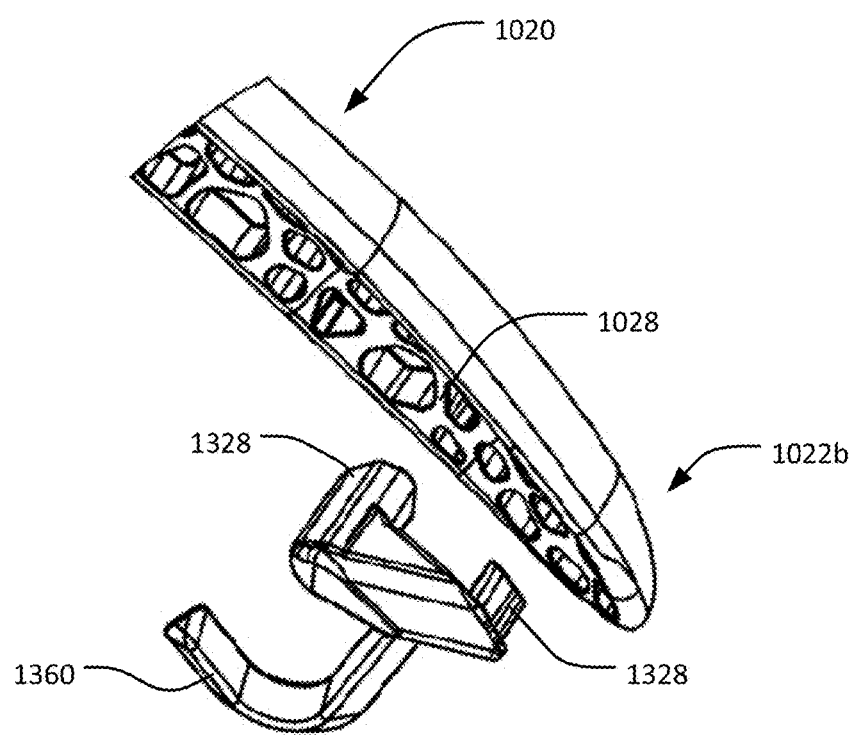
FIG. 42A is a partial exploded view of the hanger and hooks of FIG. 41.
Figure 43:
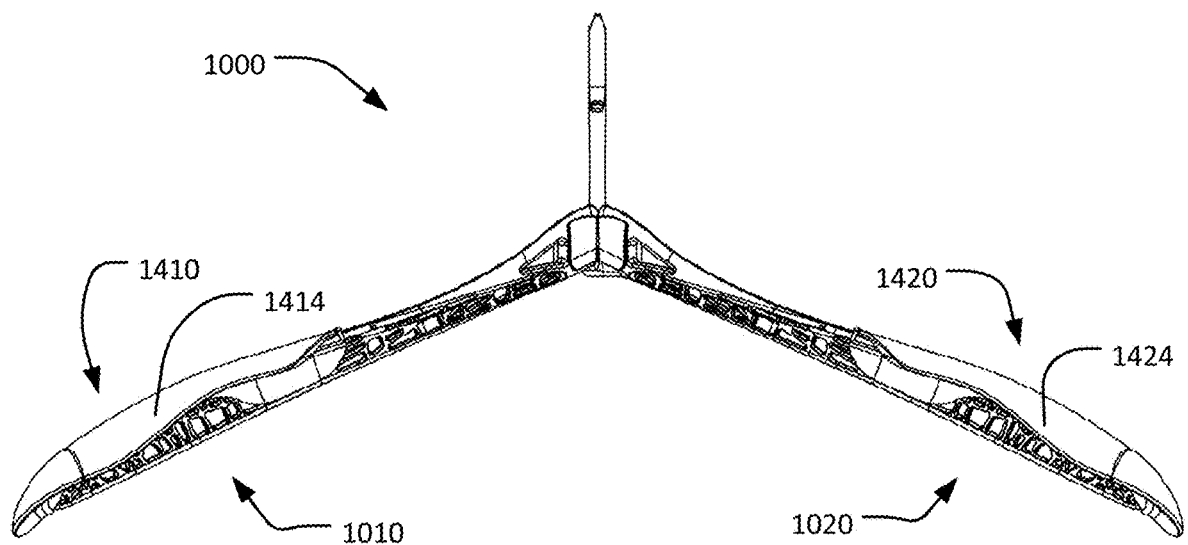
FIG. 43 is a front view of shoulder contours in use with the hanger of FIG. 27, shown with the hanger in the extended configuration.
Figure 44:
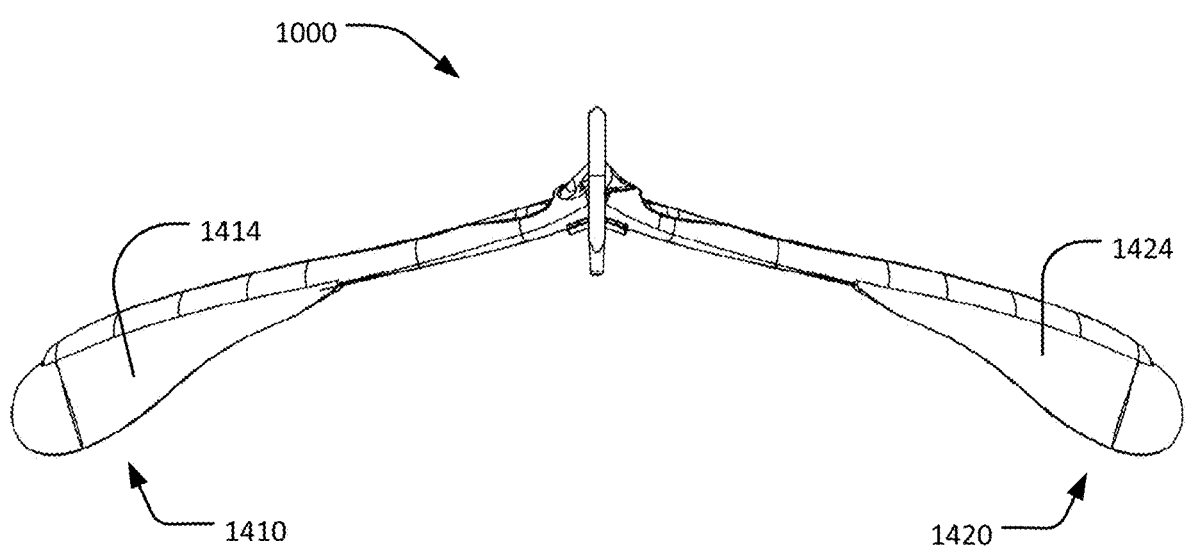
FIG. 44 is a top view of the hanger and shoulder contours of FIG. 43, shown with the hanger in the extended configuration.
Figure 45:
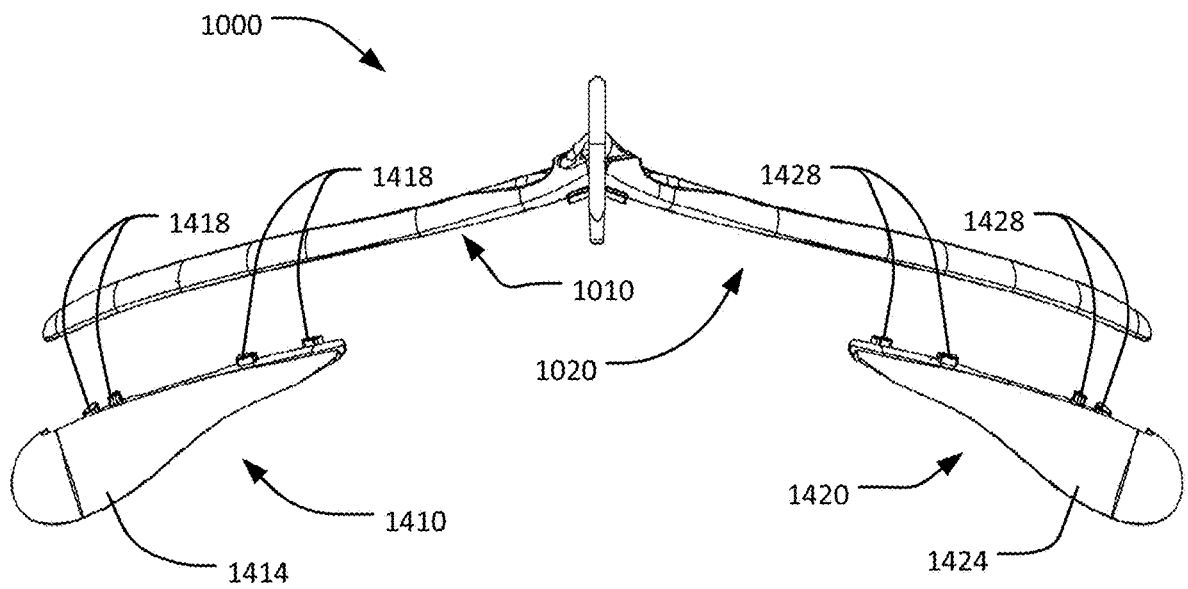
FIG. 45 is an exploded top view of the hanger and shoulder contours of FIG. 43, shown with the hanger in the extended configuration.
Figure 46:
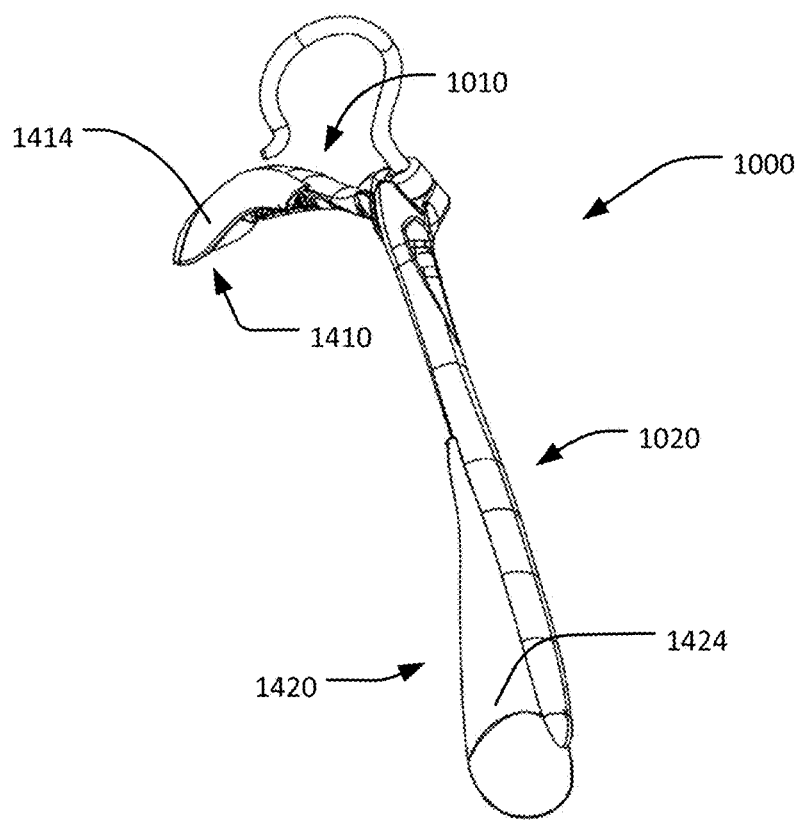
FIG. 46 is a side perspective view of the hanger and shoulder contours of FIG. 43, shown with the hanger in the extended configuration.

The hinge pin 1002 passes through the first hole 1017 and the second hole 1027 along a hinge axis 1001 and couples the first and second hanger arms 1010, 1020 to the hook 1006 such that the first and second hanger arms 1010, 1020 are moveable relative to one another between an extended (or "open") configuration (FIGS. 27, 31, 34, 36A, 37-46) and a folded (or "closed") configuration (FIGS. 32, 35, 36D). The first stop 1015 abuts the second stop 1025 when the first and second hanger arms 1010, 1020 are at the extended configuration, and the first and second stops 1015, 1025 are separated from one another when the first and second hanger arms 1010, 1020 are at the folded configuration. FIG. 28A shows a compressible fastener 1003 securing the hinge pin 1002 to the first and second hanger arms 1010, 1020; this may be particularly desirable to facilitate assembly and minimize the number of discrete pieces in the hanger 1000, but other fasteners may also (or alternately) be used. It may be particularly desirable for the knuckle 1016 and the stop 1015 to be formed integrally with the remainder of the first hanger arm 1010, and for the knuckle 1026 and the stop 1025 to be formed integrally with the remainder of the second hanger arm 1020.

The hanger 1000 departs from the hanger described with reference to FIGS. 2 through 9 primarily by: (a) each of the hanger arms 1010, 1020 having a honeycomb-like structure 1018, 1028 of ribs and cavities, though the ribs and cavities in the honeycomb-like structure 1018, 1028 need not be (and are not shown as being) hexagonal; and (b) having an aperture 1019 in the proximal end 1012a and an aperture 1029 in the proximal end 1022a. The apertures 1019, 1029 may reduce the weight and material cost of the hanger 1000, and the honeycomb-like structure 1018, 1028 may similarly reduce the weight and material cost of the hanger 1000 while also providing attachment points for various accessories. In the embodiment 1000, at least one cavity 1018a in the honeycomb-like structure 1018 at the proximal end 1012a forms a proximal attachment point, and at least one cavity 1028a in the honeycomb-like structure 1028 at the proximal end 1022a forms a proximal attachment point.

Yet the operation of the hanger 1000 is the same as operation of the hanger described with reference to FIGS. 2 through 9: rotation of the hanger 1000 about the hinge axis 1001 causes the hanger arms 1010, 1020 to automatically move between the extended and folded configurations. As shown in FIG. 31, the hanger 1000 has a center of gravity when the first and second hanger arms 1010, 1020 are at the extended configuration and suspended by the hook 1006 (e.g., on a closet pole P) such that the hinge axis 1001 is angled relative to vertical in a first direction and the first and second stops 1015, 1025 are biased to abut one another. And as shown in FIG. 32, the hanger 1000 has a center of gravity when the first and second hanger arms 1010, 1020 are at the folded configuration and suspended by the hook 1006 (e.g., on the closet pole P) such that the hinge axis 1001 is angled relative to vertical in a second direction and the stops 1015, 1025 are biased to be separated from one another. From the stationary frame of reference of FIGS. 31 and 32, the first direction is negative to vertical and the second direction is positive to vertical, but from an opposite frame of reference, the first direction is positive to vertical and the second direction is negative to vertical; the specific frame of reference is not particularly material so long as there is movement as described. More particularly, each hanger arm 1010, 1020 has a respective center of gravity such that angular movement of the hinge pin 1002 away from the first direction past an unstable equilibrium (e.g., vertical) causes the first and second hanger arms 1010, 1020 to automatically move toward the folded position. To ensure operability, it may be desirable for the first and second holes 1017, 1027 to not pass through an imaginary plane that is parallel to the hinge axis 1001 and which passes through the center of gravity of each hanger arm 1010, 1020 when the first and second hanger arms are at the extended configuration.

FIGS. 33A through 36D illustrate various accessories that may be used with the hanger 1000. FIGS. 33A through 36D specifically show a tightening claw 1100. The tightening claw 1100 has at least one protrusion 1118 for interacting with the first arm 1010 adjacent the cavity 1018a and at least one protrusion 1128 for interacting with the second arm 1020 adjacent the cavity 1028a. In the embodiment shown in FIGS. 33A through 36D, there are two protrusions 1128 that lock the tightening claw 1100 to the second arm 1020 by being press fit into the cavities 1028a, and two protrusions 1118 that exert a force on the first arm 1010 adjacent two cavities 1018a to set an amount of force which must be overcome for the hanger 1000 to move from the extended configuration to the folded configuration. The amount of force may be adjusted as desired in the manufacturing process by increasing or decreasing an amount of frictional interaction between the protrusions 1118 and the first arm 1010. And while locking protrusions 1028 are shown interacting with the second arm 1020 and tensioning protrusions 1018 are shown interacting with the first arm 1010, in other embodiments locking protrusions may be configured to interact with the first arm 1010 and tensioning protrusions may be configured to interact with the second arm 1020. FIGS. 34 and 36A show the hanger 1000 with the tightening claw 1100 in the extended configuration, FIGS. 35 and 36D show the hanger 1000 with the tightening claw 1100 in the folded configuration, and FIGS. 36B and 36C show transitory phases between the extended and folded configurations. In some embodiments, the tightening claw 1100 may be removable if desired.

FIGS. 37 through 39A show a blocking rod 1200 for use with the hanger 1000. The blocking rod 1200 has first and second ends 1210, 1220 and a rod 1250 extending therebetween. The first end 1210 has at least one locking protrusion 1218 for interacting with the honeycomb-like structure 1018 at the distal end 1012b of the first hanger arm 1010, and the second end 1220 has at least one locking protrusion 1228 for interacting with the honeycomb-like structure 1028 at the distal end 1022b of the second hanger arm 1220. Additionally, it may be desirable for one or more hook 1260 to be located along the rod 1250 (e.g., at the ends 1210, 1220 as shown).

To use the blocking rod 1200, the hanger 1000 is placed at the extended configuration and the locking protrusions 1218, 1228 are respectively press fit into mating cavities in the honeycomb-like structure 1018, 1028 in the first and second hanger arms 1010, 1020. Items may then be hung over the rod 1250 or suspended from the hooks 1260. While the hanger 1000 may function as desired for using the rod 1250 and the hooks 1260, it nevertheless will not move from the extended configuration to the folded configuration until after the blocking rod 1200 is removed from the first and second hanger arms 1010, 1020.

FIGS. 40 through 42A show hooks 1300 for use with the hanger 1000. While a pair of hooks 1300 are shown, more or fewer hooks 1300 may be used. Each hook 1300 has at least one hook 1360 and at least one locking protrusion 1318 or 1328 for interacting with the honeycomb-like structure 1018 of the first arm 1010 or the honeycomb-like structure 1028 of the second arm 1020. To use a respective hook 1300, the hanger 1000 may be at either the extended configuration or the folded configuration and the locking protrusion 1318 or 1328 is press fit into a mating cavity in the honeycomb-like structure 1018 or 1028. Items may then be suspended from the hook 1360. The hooks 1300 may not affect the ability of the hanger 1000 to move between the extended and folded configurations, and may be removed if desired.

FIGS. 43 through 46 show a pair of shoulder contours for use with the hanger 1000. More particularly, a first shoulder contour 1410 is provided for use with the first hanger arm 1010, and a second shoulder contour 1420 is provided for use with the second hanger arm 1020. Each shoulder contour 1410, 1420 has a contour surface 1414, 1424 and at least one locking protrusion 1418, 1428 for interacting with the honeycomb-like structure 1018, 1028. To use the shoulder contours 1410, 1420, the hanger 1000 may be at either the extended configuration or the folded configuration and the locking protrusions 1418, 1428 are press fit into mating cavities in the honeycomb-like structure 1018, 1028. The contour surfaces 1414, 1428 extend the support surfaces 1014, 1024, as may be desirable for certain clothing such as jackets. The shoulder contours 1410, 1420 may not affect the ability of the hanger 1000 to move between the extended and folded configurations, and may be removed if desired.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations and are contemplated within the scope of the present disclosure.

The invention claimed is:

1. A folding hanger, comprising:
a hinge pin having upper and lower ends;
a hook operably coupled to the hinge pin upper end for suspending the hinge pin;
a first hanger arm having proximal and distal ends and defining a support surface therebetween, the first hanger arm proximal end defining a first stop;
a first knuckle extending from the first hanger arm proximal end, the first knuckle having a first hole;
a second hanger arm having proximal and distal ends and defining a support surface therebetween, the second hanger arm proximal end defining a second stop; and
a second knuckle extending from the second hanger arm proximal end, the second knuckle having a second hole;
wherein the hinge pin passes through the first hole and the second hole along a hinge axis and couples the first and second hanger arms to the hook such that the first and second hanger arms are movable relative to one another between an extended configuration and a folded configuration, the first stop abutting the second stop when the first and second hanger arms are at the extended configuration, the first stop being separated from the second stop when the first and second hanger arms are at the folded configuration;
wherein the folding hanger has a center of gravity when the first and second hanger arms are at the extended configuration and suspended by the hook such that: the hinge axis is angled relative to vertical in a first direction and the first and second stops are biased to abut one another;
wherein the folding hanger has a center of gravity when the first and second hanger arms are at the folded configuration and suspended by the hook such that: the hinge axis is angled relative to vertical in a second direction and the first and second stops are biased to be separated from one another; and
wherein from a stationary frame of reference either:
(a) the first direction is positive to vertical and the second direction is negative to vertical; or
(b) the first direction is negative to vertical and the second direction is positive to vertical.

2. The folding hanger of claim 1, wherein:
the first hanger arm has a first center of gravity;
the second hanger arm has a second center of gravity; and
when the first and second hanger arms are at the extended configuration, the hinge axis is offset from an imaginary plane that passes through the first center of gravity and the second center of gravity, the imaginary plane being parallel to the hinge axis.

3. The folding hanger of claim 1, wherein:
the first knuckle is formed integrally with the first hanger arm; and
the second knuckle is formed integrally with the second hanger arm.

4. The folding hanger of claim 1, wherein the hook extends from the hinge pin upper end and is formed integrally with the hinge pin.

5. The folding hanger of claim 1, wherein:
the first hanger arm has a closed honeycomb-like structure of ribs and cavities; and
the second hanger arm has a closed honeycomb-like structure of ribs and cavities.

6. The folding hanger of claim 5, wherein:
the closed honeycomb-like structure of the first hanger arm is non-hexagonal; and
the closed honeycomb-like structure of the second hanger arm is non-hexagonal.

7. The folding hanger of claim 5, further comprising an accessory coupled to at least one item selected from the group consisting of: the closed honeycomb-like structure of the first hanger arm and the closed honeycomb-like structure of the second hanger arm.

8. The folding hanger of claim 7, wherein the accessory comprises a locking protrusion.

9. The folding hanger of claim 5, further comprising a tightening claw accessory comprising:
a locking protrusion for coupling to the closed honeycomb-like structure of one of the hanger arms;
a tensioning protrusion for frictionally interacting with the closed honeycomb-like structure of the other of the hanger arms, an amount of frictional interaction between the tensioning protrusion and the closed honeycomb-like structure of the other of the hanger arms determining an amount of force necessary to be overcome for the first and second hanger arms to move to the folded configuration.

10. The folding hanger of claim 5, further comprising a blocking rod accessory comprising first and second ends and a rod extending therebetween, wherein:
the first end has a first locking protrusion for interacting with the closed honeycomb-like structure of the first hanger arm at the first hanger arm distal end;
the second end has a second locking protrusion for interacting with the closed honeycomb-like structure of the second hanger arm at the second hanger arm distal end; and
the first and second hanger arms cannot move from the extended configuration to the folded configuration when the first and second locking protrusions couple the first and second ends to the first and second hanger arms.

11. The folding hanger of claim 5, further comprising a hook accessory comprising:
an accessory hook; and
a locking protrusion for interacting with the closed honeycomb-like structure of at least one of the hanger arms to install the accessory hook to a respective said hanger arm;
wherein installation of the accessory hook does not prevent the first and second hanger arms from moving between the extended and folded configurations.

12. The folding hanger of claim 5, further comprising a pair of shoulder contour accessories, wherein:
a first shoulder contour accessory has a first contour surface and a locking protrusion for interacting with the closed honeycomb-like structure of the first hanger arm to install the first contour surface to the first hanger arm such that the first contour surface extends the support surface of the first hanger arm; and
a second shoulder contour accessory has a second contour surface and a locking protrusion for interacting with the closed honeycomb-like structure of the second hanger arm to install the second contour surface to the second hanger arm such that the second contour surface extends the support surface of the second hanger arm;
wherein installation of the first and second shoulder contour accessories does not prevent the first and second hanger arms from moving between the extended and folded configurations.

13. The folding hanger of claim 1, wherein the hook extends directly from the hinge pin upper end.

14. A folding hanger, comprising:
a hinge pin having upper and lower ends;
a hook operably coupled to the hinge pin upper end for suspending the hinge pin;
a first hanger arm having proximal and distal ends and defining a support surface therebetween, the first hanger arm proximal end has a first stop;
a first knuckle extending from the first hanger arm proximal end, the first knuckle having a first hole;
a second hanger arm having proximal and distal ends and defining a support surface therebetween, the second hanger arm proximal end has a second stop; and
a second knuckle extending from the second hanger arm proximal end, the second knuckle having a second hole;
wherein the hinge pin passes through the first hole and the second hole along a hinge axis and couples the first and second hanger arms to the hook such that the first and second hanger arms are movable relative to one another between an extended configuration and a folded configuration, the first stop abutting the second stop when the first and second hanger arms are at the extended configuration, the first stop being separated from the second stop when the first and second hanger arms are at the folded configuration;
wherein the folding hanger has a center of gravity when the first and second hanger arms are at the extended configuration and suspended by the hook such that: the hinge axis is angled relative to vertical in a first direction and the first and second stops are biased to abut one another; and
wherein the first hanger arm and the second hanger arm each have a respective center of gravity such that angular movement of the hinge axis past an unstable equilibrium causes the first and second hanger arms to move toward the folded configuration.

15. The folding hanger of claim 14, wherein:
the first hanger arm has a first center of gravity;
the second hanger arm has a second center of gravity; and
when the first and second hanger arms are at the extended configuration, the hinge axis is offset from an imaginary plane that passes through the first center of gravity and the second center of gravity, the imaginary plane being parallel to the hinge axis.

16. The folding hanger of claim 14, wherein:
the first knuckle and the first stop are formed integrally with the first hanger arm;
the second knuckle and the second stop are formed integrally with the second hanger arm; and
the hook extends from the hinge pin upper end and is formed integrally with the hinge pin.

17. The folding hanger of claim 14, wherein:
the first hanger arm has a closed honeycomb-like structure of ribs and cavities; and
the second hanger arm has a closed honeycomb-like structure of ribs and cavities.

18. The folding hanger of claim 17, wherein:
the closed honeycomb-like structure of the first hanger arm is non-hexagonal; and the closed honeycomb-like structure of the second hanger arm is non-hexagonal.

19. A folding hanger, comprising:

a hinge pin having upper and lower ends;

a hook operably coupled to the hinge pin upper end for suspending the hinge pin;

a first hanger arm having proximal and distal ends and defining a support surface therebetween, the first hanger arm proximal end has a first stop;

a first knuckle extending from the first hanger arm proximal end, the first knuckle having a first hole;

a second hanger arm having proximal and distal ends and defining a support surface therebetween, the second hanger arm proximal end has a second stop; and a second knuckle extending from the second hanger arm proximal end, the second knuckle having a second hole;

wherein the hinge pin passes through the first hole and the second hole along a hinge axis and couples the first and second hanger arms to the hook such that the first and second hanger arms are movable relative to one another between an extended configuration and a folded configuration, the first stop abutting the second stop when the first and second hanger arms are at the extended configuration, the first stop being separated from the second stop when the first and second hanger arms are at the folded configuration;

wherein the folding hanger has a center of gravity when the first and second hanger arms are at the extended configuration and suspended by the hook such that: the hinge axis is angled relative to vertical in a first direction and the first and second stops are biased to abut one another; and wherein the first hanger arm and the second hanger arm each have a respective center of gravity such that angular movement of the hinge pin away from the first direction past vertical causes the first and second hanger arms to automatically move toward the folded configuration.

20. The folding hanger of claim 19, wherein:

the first hanger arm has a first center of gravity;

the second hanger arm has a second center of gravity; and when the first and second hanger arms are at the extended configuration, the hinge axis is offset from an imaginary plane that passes through the first center of gravity and the second center of gravity, the imaginary plane being parallel to the hinge axis.

* * * * *

UNITED STATES PATENT AND TRADEMARK OFFICE
CERTIFICATE OF CORRECTION

PATENT NO. : 12,029,338 B2
APPLICATION NO. : 17/443164
DATED : July 9, 2024
INVENTOR(S) : George-Adrian Anton It is certified that error appears in the above-identified patent and that said Letters Patent is hereby corrected as shown below:

On the Title Page

(73) Assignee: Folding Hangers "SAL" should be corrected to Folding Hangers "SRL".

Signed and Sealed this
Tenth Day of December, 2024

Katherine Kelly Vidal
*Director of the United States Patent and Trademark Office*